United States Patent [19]

Sano et al.

[11] Patent Number: 5,718,954
[45] Date of Patent: Feb. 17, 1998

[54] SUBSTANCE INCLUDING NATURAL ORGANIC SUBSTANCE FINE POWDER

[75] Inventors: Masahiro Sano; Satoshi Mikami, both of Himeji; Nobutaka Sasaki, Chuou-ku; Nobuo Kusamoto, Himeji; Fumioki Fukatsu, Himeji; Atsuhiko Ubara, Himeji; Takaharu Yasue, Himeji; Shigeru Ohyama, Osaka, all of Japan

[73] Assignee: Idemitsu Petrochemical Co., Ltd., Tokyo, Japan

[21] Appl. No.: 374,788

[22] PCT Filed: May 24, 1994

[86] PCT No.: PCT/JP94/00823

§ 371 Date: Jul. 17, 1995

§ 102(e) Date: Jul. 17, 1995

[87] PCT Pub. No.: WO94/28056

PCT Pub. Date: Dec. 8, 1994

[30] Foreign Application Priority Data

| May 24, 1993 | [JP] | Japan | 5-121743 |
| Jun. 2, 1993 | [JP] | Japan | 5-131926 |
| Jun. 8, 1993 | [JP] | Japan | 5-137598 |
| Jun. 10, 1993 | [JP] | Japan | 5-138440 |
| Dec. 27, 1993 | [JP] | Japan | 5-332132 |
| Apr. 6, 1994 | [JP] | Japan | 6-068525 |
| Apr. 6, 1994 | [JP] | Japan | 6-068526 |
| Apr. 8, 1994 | [JP] | Japan | 6-070618 |
| Apr. 22, 1994 | [JP] | Japan | 6-084412 |
| May 10, 1994 | [JP] | Japan | 6-096327 |
| May 17, 1994 | [JP] | Japan | 6-102924 |

[51] Int. Cl.$^6$ .................. D06M 10/00; C08J 5/18; B24D 15/00

[52] U.S. Cl. ............ 428/35.6; 428/283; 524/10; 524/11; 524/12; 524/13; 524/17; 524/18; 524/19; 524/20; 524/21; 106/124; 106/406; 106/407; 106/493

[58] Field of Search .................. 524/10–13, 17, 524/21, 18, 19, 20; 428/35.6, 283; 106/124, 406, 407, 493

[56] References Cited

U.S. PATENT DOCUMENTS

| 3,634,184 | 1/1972 | Wang | 428/283 |
| 4,223,211 | 9/1980 | Ohtomo et al. | 424/69 |
| 4,325,741 | 4/1982 | Otoi et al. | 424/69 |
| 4,456,639 | 6/1984 | Drower et al. | 428/13 |
| 4,834,762 | 5/1989 | Nishibori | 524/10 |

OTHER PUBLICATIONS

English Translation of Japanese Patent Appln. No. Sho 39–1941 entitled "Method of Producing Powder Silk Fibroin for Utilizing For Chromatograph" (1 page).

English Translation of Japanese Patent Appln. No. Sho 61–36840 entitled "Method of Producing Powder Silk Fibroin" (1 page).

(List continued on next page.)

Primary Examiner—Charles Nold
Attorney, Agent, or Firm—Flynn, Thiel, Boutell & Tanis, P.C.

[57] ABSTRACT

Materials containing fine natural organic material particles are disclosed. As the fine particles, superfine silk fibroin particles are produced by a process comprising a first step of comminuting silk fibroin into coarse particles with dry mechanical comminuting means, a second step of comminuting the coarse silk fibroin particles into fine particles with dry mechanical comminuting means, and a third step of comminuting the fine silk fibroin particles into superfine particles with an average particle diameter of 10 μm or below with dry mechanical comminuting means, the silk fibroin particles being beta-treated during or after at least one of the first to third comminuting steps. Specific examples of the material are films, sheets, paints, fiber treating materials, etc.

25 Claims, 5 Drawing Sheets

OTHER PUBLICATIONS

English Translation of Japanese Patent Appln. No. Sho 63–51160 entitled "Method of Producing Powder Silk Fibroin" (1 page).

English Translation of Japanese Patent Appln. No. Hei 1–293142 entitled "Method of Grinding for Silk, Resin Film, Resin Membrane and Coating" (1 page).

English Translation of Japanese Patent Appln. No. Hei 3–195800 entitled "For Products of Molding in Leather Type" (1 page).

English Translation of Japanese Patent Appln. No. Hei 4–300369 entitled "Silk Fine Powder and Method of Producing Silk Fine Powder Used to Reform Feeling and Function of Artificial Leather" (1 page).

"Leather and fur processing", Fibrous protein, and Collagen. McGraw–Hill Encyclopedia of Science & Technology, 681–682, 101, 143–145, 1992.

SUBSTANCE INCLUDING NATURAL ORGANIC SUBSTANCE FINE POWDER

BACKGROUND OF THE INVENTION

1. Field of the Invention

This invention relates to a method for producing a substance including a natural organic substance fine powder, such as a silk fine powder, which can be used in plastics film or sheet, coating medium, fiber treatment agents and the like.

2. Description of the Related Art

Prior art thermoplastic films, for instance, an olefin type such as polyethylene and polypropylene, are inferior in the moisture absorbing/releasing property and also the anti-condensation property. Further, they are sometimes sticky. Therefore, they have been inferior in their overall character.

A thermoplastics film which additionally contains a waxing compound is apt to be poor in drape and does not show good results in moisture permeation property, moistureabsorption-and-discharge property and condensation inhibition property.

According to the inventions disclosed in Japanese Patent Laid-Open Publication No. 3-195800 and also Japanese Patent Laid-Open Publication No. 1-293142, there are attempts to overcome the above drawbacks by incorporating skin particles or silk particles in thermoplastic films. The particles of these natural organic materials, however, have a great water content, and therefore their dispersion is poor. In addition, the natural organic material powder and the plastics are subject to hydrolysis due to their water content, thus posing problems in the stability during film formation (such as generation of gum or bubbles) to disable continuous production. Further, the overall character, moisture absorbing/releasing property, moisture permeability and anti-condensation property are unsatisfactory, and satisfactory effects of incorporating the above power additives are not attained.

A first object of the invention, accordingly, is to provide a thermoplastic film and laminate with excellent overall character, moisture absorbing/releasing property, moisture permeability, anti-condensation property, anti-blocking property, etc.

A second object of the invention is to provide a method of manufacturing the thermoplastic film as noted above.

When writing or printing a letter, numeral or graphic directly on plastic article, glassware, metal parts or the like, the respective surfaces to be written or printed are too smooth to put letters thereon having clarity and abrasion resistance by using generally used ink.

Accordingly, when signing on a credit card or writing on a video cassette tape a recording date and contents thereof by using a water aqueous ink pen or ball point pen, it has been required to use paper labels capable of being stuck on them after writing information thereon.

Otherwise, a white coating is preliminary put on a portion of the card and cassette tape to make a surface to be written on. These coating materials are generally combined with silica for delustering.

However, in a conventional process utilizing the labels, it was always necessary to prepare labels with an adhesive agent and prepare a new one for every card or cassette tape, which is time-consuming and costly.

When using a coating material containing silica for writing, there will be disadvantages such that the written letters are easily defaced and unreadable (poor adhesion or low abrasion resistance), the surface of the coating film is hard and slippery, the touch feeling is bad and the like.

Especially when writing with a water ink, the ink is not absorbed into the material so that the ink is shed. As the ink after writing does not readily dry, the ink may run on the paper after being touched by fingers to break the written letters, and even after drying, the written letters still tend to wipe off. Furthermore, the touch feeling is not so comfortable and the write feeling is not fine.

Accordingly, it is the third object of the present invention to provide a coating material which forms an information display surface and products having a surface to be written on formed by this coating material, which provides a good adhesion and feel.

There have been proposed various kinds of methods for producing silk fibroin fine powder such as following (a)–(b) conventional methods.

(a) Japanese Patent Publication No. 39-1941 has proposed a method for producing silk fibroin for chromatography including the steps of dissolving silk fibroin into a cuproethylenediamine solution, adding alcohols to a silk fibroin solution obtained by dialysis, drying the deposit, and pulverizing the thus dried deposit.

(b) Japanese Patent Publications Nos. 61-36840 and 63-51160 have proposed methods for producing silk fibroin 63-51160 including the steps of first soaking silk thread, pressurizing and heating it in a pressure chamber by means of saturated steam, disposing it abruptly under low pressure to expand, and drying and pulverizing it.

(c) Japanese Patent Laid-open No. 4-300369 has proposed a method having the steps of conducting hydrolysis of fibroin by means of hydrochloric acid for deterioration processing and mechanically pulverizing it.

In accordance with the conventional method (a), since the internal structure of silk fibroin is broken down by such chemical treatment, the natural drape of silk may be injured.

In the conventional method (b), a rather high production skill will be required since the required steps, such as heating and pressuring, are complicated.

In accordance with the conventional method (c), it has been known that the deterioration degree control of silk, when conducting deterioration processing by using hydrochloric acid, is difficult and the natural drape of silk may not be obtained as in the (a) method.

Though a preferable silk fibroin fine powder should be effectively dispersed in a resin solution (DMF, MKE, Water, etc.) before its manufacture into synthetic leather, simulated synthetic leather substitute, film, sheet and so on, the above-mentioned silk fibroin fine powder could not be dispersed well. If the silk fibroin fine powder cannot be dispersed well or aggregates, the so-called touch feeling gets worse and the drape may be ruined.

Various products containing silk fibroin particles, which are obtainable by the prior art methods, may not always be satisfactory in the moisture absorbing/releasing property, sense of touch, appearance, etc.

It is the fourth object of the present invention to provide a method of producing silk fibroin ultrafine powder which has a particle size of or less than 10 μm and disperses well in the products.

A fifth object of the invention is to provide superfine silk fibroin particles which are obtainable by the above method.

Regarding paints containing silk fibroin particles, for instance, it has been difficult to obtain paints having pastel colors, white color, light colors, etc., because the silk fibroin particles obtainable by the prior art method are colored yellow or green.

Further, with data display surface formation paints containing silk fibroin particles, satisfactory moisture absorbing/releasing property, as well as writing accepting property and excellent sense of touch based on the moisture absorbing/releasing property, may not always be obtained, depending on the silk fibroin particles obtained by the prior art method.

A sixth object of the invention is to provide various products containing silk fibroin particles as noted above.

DISCLOSURE OF THE INVENTION

A thermoplastic film in accordance with the present first invention is composed of from 1 to 40 wt % by weight of a natural organic substance fine powder which has an average particle size of at most 30 μm and can be formed by one of an inflation method, T-die extrusion method or calendering method.

If the average particle size of the natural organic substance fine powder exceeds 30 μm, the obtained film is poor in drape (rough touch) and sometimes has pinholes formed unexpectedly during its production.

If the content of the fine powder of natural organic material is less than 1 wt %, it is difficult to obtain such powder incorporation effects as moisture absorbing/ releasing property, moisture permeability, condensation suppression property, etc. In addition, with polyurethane or a like plastic material subject to blocking, during the film manufacture, blocking takes place to deteriorate its processibility.

If more than 40 wt % is present, the contained fine powders agglomerate with one another to worsen the appearance and drape of the produced film and also to make the forming stability worse. Accordingly, the recommended percentage for the natural organic substance fine powder is set at a range of from 5 to 15 wt %.

Typical examples of the thermoplastic material are vinyl chloride resins, polystyrene, acrylic resins (e.g., AS, ABS, etc.), polyethylene, polypropylene, fluoride resins, polyamide resins, polycarbonate, and thermoplastic elastomers of the urethane type, ester type, olefin type, etc.

The natural organic substance fine powder is, for example, at least one member selected from the group of powdered leather, powdered silk, powdered cellulose, powdered wool, and powdered chitin, which should be mixed with the thermoplastics.

The natural organic material fine powder has to be dried before it is incorporated.

Specifically, before its use the fine natural organic material powder is dried at 50° to 200° C. for 0.5 to 30 hours, preferably at 100° to 150° C. for 2 to 16 hours, to reduce the water content to 10 wt % or below. If the water content exceeds 10 wt %, bubbles may be formed during film formation or compound formation, or gum may be generated in a short period of time. At any rate, the stability is deteriorated. Further, because of the great water content, the dispersion of the powder in the resin is inferior, thus resulting in inferior overall characteristics of the obtained film.

Further, if the water content exceeds 10 wt %, hydrolysis is brought about in the fine natural organic material powder and resin (such as polyurethane), thus making it difficult to obtain the effects of incorporating the fine natural organic material powder.

Suitably, the water content is 3 wt % or below, preferably 1 wt % or below.

In addition, into the thermoplastics film, there may be incorporated an additive, such as a heat stabilizer.

As an applicable heat stabilizer in the present invention, there are provided a phenol antioxidant, an amine antioxidant, a sulfur antioxidant and a phosphorus antioxidant, among which the phenol antioxidant is the most effective in attaining the desired phenomenon. Incidentally, the heat stabilizer should be contained in the film not more than 5 wt % by weight, preferably not more than 0.5 wt % by weight.

The method of producing the above-mentioned thermoplastics film, according to the present second invention, includes the step of forming a thermoplastic, which includes an organic substance fine powder occupying from 1 to 40 wt % by weight in total and having an average particle size of at most 30 μm, into a film shape by one of an inflation method, a T-die extrusion method or a calendering method.

The thermoplastic having a large moisture absorption property should have the water content therein maintained at, at most, 3 wt % by weight before being used as material, preferably lower than 1 wt % by weight, through a drying process. However, the drying temperature should not be too high, to prevent blocking, after-yellowing and not spoil the properties of pellets.

According to the invention, it is possible to form a film without kneading the material. However, it is suitable to knead the thermoplastic material containing the fine natural organic material powder before the film formation. A method of obtaining the above mentioned film in accordance with the present second invention essentially employs a mixture composed of a thermoplastic including the natural organic substance fine powder (hereinafter referred to as "compound") and a simple thermoplastic not including any natural organic substance fine powder so that the percentage by weight of the natural organic substance fine powder is within from 1 to 40 wt %.

The mixture of the thermoplastic compound and the simple thermoplastic can improve the dispersion property of the natural organic substance fine powder contained therein.

The compound may be prepared by means of one of a uniaxial extruder, biaxial extruder, Bumbury's mixer, and kneading machine.

However, it is generally noted that even if the materials mixed with the thermoplastic and the natural organic substance fine powder is carefully prepared to obtain the well dried compound, the actually obtained and used compound is apt to contain plenty of moisture since the natural organic substance fine powder is naturally rich in moisture absorption. Accordingly, the compound should be dried before being used at the temperature of 50°–200° C. for 10 minutes-24 hours, preferably at the temperature of 80°–135° C. for 2–16 hours. When the drying temperature and time is set lower than the above-mentioned range, foaming phenomenon and foreign matter may arise, while if it is carried out higher, the property will be spoiled and blocking and after-yellowing of the pellet will take place. By drying the thermoplastic material containing the fine natural organic material powder, it is possible to reduce the water content to 5 wt %, preferably 2 wt % or below, more preferably 0.5 wt % or below.

The well-dried compound is fed into the molding machine carefully, not to absorb moisture therein again, for which it should be promptly supplied into a hopper of the molding machine, otherwise the hopper should be provided with a drying machine. For instance, if there is a possibility that troublesome moisture absorption will take place after the drying treatment, the drying machine accompanying the hopper of the molding machine should run under a condition of a temperature of 50°–200° C., preferably 80°–135° C.

It should be naturally understood that the drying machine can be a hot-air drying machine, vacuum drying machine or dehumidifying drying machine.

The produced thermoplastic film in accordance with the present second invention can be naturally used independently and will be also available to be used in public in a laminated product state consisting of other films, sheets and so on. There can be provided a laminated product with plastic, non-woven fabric, cloth, knitting, foam, natural leather or synthetic leather. The method of lamination can be carried out by means of any adhesive agent or a set of dies with heat.

A coating material forming an information display surface in accordance with the present third invention contains a natural organic substance fine powder.

The coating material forming an information display surface is of a coating material defining medium when writing letters or printing on a plastic article, glassware and metal parts.

The natural organic substance fine powder may be one or more selected from the group of silk fine powder, collagen fine powder, keratin fine powder, wool fine powder, cellulose fine powder, cotton fine powder, hemp yarn fine powder, chitin fine powder and chitosan fine powder.

The particle diameter of the natural organic substance fine powder may have a maximum particle diameter of at most 50 μm and an average particle diameter of 15 μm, preferably a maximum particle diameter of at most 20 μm and an average particle diameter of 10 μm, and more preferably, a maximum particle diameter of, at most, 10 μm and an average particle diameter of 3 μm. When making the average particle diameter smaller in size, the touch feeling and write feeling will be surely improved.

The content of the natural organic substance fine powder is recommended to be from 5 to 80 wt % by weight, preferably from 5 to 40 wt %. Otherwise, the content of the natural organic substance fine powder should be from 5 to 100 phr, preferably from 20 to 40 phr against the coating material compound excepting fine powder. If less than 5 phr, the water absorption by the natural organic substance fine powder will become insufficient and harm the write feeling. On the other hand, if over 100 phr, the solid state properties as a coating material becomes worse (e.g., easy to be injured) and laminating becomes uncomfortable because of increased viscosity.

As the coating materials, except for a natural organic substance fine powder, a base resin, solvent medium, auxiliary and pigment can be included.

The base resin can selected widely in view of the printing object and subject. For example, a urethane resin, polyester resin, ethylene-vinyl acetate resin, acrylic resin, vinyl resin, epoxy resin, chlorinated polyolefin resin, cellulose resin and the like can be used either singly or after mixing with each other.

In order to increase the brightness of the coloring pigment, $TiO_2$ is mainly used, but silica, calcium carbonate and the like can also be used as the loading pigment.

The solvent medium may be, for example, a fatty series, ketone series, alcohol series, aromatic series or ethyl ether series. The solvent should be selected based upon the kind of resin, print object, printing process and object.

As the coating material, except for a natural organic substance fine powder, a base resin, solvent medium, auxiliary and pigment can be included.

As the auxiliary, there are an anti-foaming agent, plasticity agent and the like. The selection of them should be based on the purpose of the auxiliary, print object and print condition. The purpose of the auxiliary is to reinforce the solid state properties of the film and set property.

As the pigment, there are coloring pigments and loading pigments used for coloring ink and matting. In order to increase the brightness of the coloring pigment, $TiO_2$ is mainly used, but silica, calcium carbonate and the like can be used as the loading pigment. In the present invention, by loading a natural organic substance fine powder, the water absorption is improved but when the water absorption is excessive, the color of the ink may be too light. In this state, by loading a fine powdered loading pigment such as silica, calcium carbonate, the water absorption property can be controlled.

The product having a surface to be written on in accordance with the present invention has a surface to be written on formed by the coating material for an information display surface.

But, the coating method of the coating material is not limited, for example, screen printing, aniline process, pad print and the like are available.

The final product having a surface to be written on should be considered to be any item having a surface to be written on, such as a cash card, credit card, audio cassette tape, video cassette tape, stationery product and the like.

The material for the product having a surface to be written on is not limited, for example, plastics, metal, wood and so on. The preferred plastics are polyvinyl dichloride resin, polystyrene resin, polyester resin, polyethylene resin, polypropylene resin, polycarbonate resin and the like.

Accordingly, a method for producing silk fibroin ultrafine powder in accordance with the present fourth invention has a first step of pulverizing silk fibroin into a crushed powder state by means of a dry-type mechanical pulverization means, a second step of pulverizing the silk fibroin crushed powder into a fine powder state by means of a dry-type mechanical pulverization means, a third step of pulverizing the silk fibroin fine powder into a ultrafine powder having an average particle diameter no greater than 10 μm by means of a dry-type mechanical pulverization means, and a step of beta-treating the silk fibroin powder in at least one step of said first to third steps or after said three steps.

The average particle diameter of the crushed powder is recommended to be about 100 μm.

The average particle diameter of the fine powder is about 20 μm.

The dry-type mechanical pulverization means used in the first pulverizing step may be any mill such as a rotary blade mill, but the dry-type mechanical pulverization means used in the second pulverizing step should be a ball mill and the dry-type mechanical pulverization means used in the third pulverizing step should be a jet mill.

As there are three steps of pulverization by means of several dry-type mechanical pulverization means to subsequently obtain the powders, each having a different particle diameter, the most preferable ultrafine powder which cannot be produced by only one mechanical pulverization will be constantly produced.

The beta treatment done in the method should be the soaking of silk fibroin in a predetermined liquid to increase the beta structure degree. Incidentally, the recommended liquid is, for example, a solvent medium, neutral saline solution or the like. The solvent medium is an alcohol, such as methanol and ethanol, or acetone and so on.

The recommended normal salt is, for example, sodium chloride, potassium chloride, sodium sulfate, ammonium sulfate and sodium nitrate.

The beta-treating of the silk fibroin powder should be done in at least one step of the first to third steps or after the three steps. Of course, it can be done over 2 times upon review of several conditions.

After conducting beta treatment, the crystallinity index will increase, preferably to more than 70% of natural silk thread, whereby the silk fibroin ultrafine powder can be uniformly dispersed in a solvent medium resin solution, water resin solution or the like. As a result, the drape of natural silk can be maintained and the final products have a fine moisture absorption and discharge property, moisture permeation property, touch feeling and further shows excellent anti-static properties and anti-blocking performance.

The final products are, for example, simulated synthetic leather substitutes, synthetic leather, fiber, rubber, film, sheet and fiber.

A fifth aspect of the invention is constituted by superfine silk fibroin particles obtainable by the above method of superfine silk fibroin particles manufacture.

A sixth aspect of the invention is constituted by an article containing the above superfine silk fibroin particles. Specific examples of the article containing superfine silk fibroin particles will be given later.

A solvent-type resin composition containing superfine silk fibroin particles according to the invention, is obtainable by incorporating the superfine silk fibroin particles in a solvent type resin solution.

Typical examples of the solvent-type resin solution are polyurethane resins, acrylic resins, polyamide resins, etc.

The solvent in the solvent-type polyurethane solution may be diethyl formamide, methyl ethyl ketone, toluene, isopropyl alcohol, etc.

A film or sheet containing superfine silk fibroid powder is obtainable by incorporating the superfine silk fibroid powder into a solvent-type resin solution.

The film or sheet noted above may be formed by dry or wet knife coating, graver coating, spraying, dipping, etc.

As a lamination process may be used, when using a polyurethane resin, for instance, one in which a base material is impregnated with a resin solution containing the superfine silk fibroin particles, a wet process in which the above solution is coated on the base material to form a film thereon, or a dry process in which a film or sheet containing the superfine silk fibroin particles is formed using the above solution or the like and laminated on the base material, either directly or via an adhesive.

The thermoplastic resin composition containing superfine silk fibroin particles according to the invention is obtainable by adding the superfine silk fibroin particles to the thermoplastic resin solution.

Typical examples of the thermoplastic resin are chain-like low-density polyethylene resins (L-LDPE), polypropylene resins (PP), polystyrene resins (PS), high density polyethylene resins (HDPE), thermoplastic olefin resins (TPD), etc.

A film or a sheet containing superfine silk fibroin particles is obtained by incorporating the superfine silk fibroin particles.

Depending on the purpose, such as quality stabilization, or on the environment of use, the film or sheet according to the invention may contain necessary amounts of additives usually used in this field, such as fibers, anti-oxidization agents, ultraviolet radiation absorbers as well as processibility improving agents, e.g., plasticizers, stabilizers, lubricants, etc., fillers, and coloring agents, dies, pigments, etc.

The proportions of the superfine silk fibroin particles and the synthetic resin are in a range of 1 to 60 wt % of superfine silk fibroin particles for 99 to 10 wt % of the synthetic resin solid part. If the proportion of the superfine powder exceeds 60 wt %, the film or sheet may be fragile. If the proportion is less than 1 wt %, the effects of adding the powder cannot be obtained. However, the proportion of the superfine powder in the synthetic resin is suitably 5 to 50 wt %.

The film or sheet according to the invention suitably has a thickness of 5 μm or above, and the superfine powder is suitably dispersed uniformly therein. The superfine powder may be exposed at the surface. This state is useful for improving the sense of touch or sense of warmness.

The film or sheet may be formed by calender forming, T-die forming, inflation forming, etc.

Further, the laminate is formed such that a film or a sheet containing the superfine silk fibroin particles is one of a plurality of layers laminated on a base material or is the base material itself.

The base material may be a woven cloth of natural or chemical fibers as noted above, cotton cloth, non-woven cloth, synthetic resin films or sheets, leather, paper, etc. If necessary, the laminate may be surface finished by buffing, emboss rolling, etc.

As the laminating process may be adopted coating, wet lamination, extrusion lamination, dry lamination, press lamination, stamping, metal fitting, etc.

The molding according to the invention is formed by injection molding, blow molding, hollow molding or press molding a thermoplastic resin composition containing the superfine silk fibroin particles, which is obtained by incorporating the superfine silk fibroin particles in a thermoplastic resin.

The superfine powder may be exposed at the surface of the molding. This state is useful for improving the sense of touch or sense of warmness.

Further, a composite molding or molding is molded to be integral with a different material.

The different material may be a woven cloth of natural or chemical fibers, cotton cloth, non-woven cloth, synthetic resin moldings, films or sheets, paper, etc. If necessary, the molding may be surface finished by buffing or squeezing.

The fiber processing material according to the invention is obtained by incorporating the superfine silk fibroin particles into a resin emulsion.

The fiber processing material according to the invention contains 99 to 10 wt. parts of the resin emulsion as solids and 1 to 90 wt. parts of the superfine silk fibroin particles. Further, it contains an adequate solvent component, for instance, water.

For improving the durability, a cross-linking agent (of epoxy type, melamine type, etc.) or a coupling agent may be added to the fiber processing material.

Further, for suppressing the precipitation or aggregation of the superfine silk fibroin particles in the fiber processing material bath, a usual anti-precipitation agent or dispersing agent may be added. An example of the anti-precipitation agent is a non-ionic active agent derived from a fatty acid or high grade alcohol. Examples of the dispersing agent are sodium polystyrene sulfonic acid, sulfonic acid type copolymer ammonium salt, etc.

The resin emulsion comprises one or more members of the resin emulsion group consisting of polyurethane type resins, polyester type resins, silicon type resins, fluorine type resins and acrylic type resins.

The silicon type resins are suitably those which are amino or epoxy denatured and capable of being chemically coupled to the OH group, particularly those of net-like coupling type with functional groups at the opposite ends. These resins are excellent in their effect of preventing the falling of superfine silk fibroin particles and adhesion to fibers.

The fiber processing material according to the invention may be used to process fibers, fiber material cloth and fiber material cotton. The fiber material cloth may be woven cloth, braided cloth, non-woven cloth, etc. The fiber material cotton may be internal cotton, such as in bedclothes, pillows, etc., and internal cotton such as in outfits for cold weather.

The process with the fiber processing material according to the invention may be performed on fibers either in the state of fibers or a state of fiber material cloth or fiber material cotton obtained by using fibers.

The fiber processing material is coated on the fibers or the like by a pad process, a spray process, etc. After the coating, the work is dried and then thermally treated. The drying and subsequent thermal treatment have an effect of improving the durability.

The falling prevention effect may be further improved by carrying out the process with the processing material containing the superfine powder and the process of drying twice repeatedly (it being possible to carry out the second process with a processing material without superfine powder) and then carrying out the thermal treatment.

The paint according to the invention is obtained by incorporating the superfine silk fibroin particles in the resin.

The paint is readily capable of all color development because of the satisfactory white degree of the superfine powder.

Further, the superfine powder can be readily incorporated in an aqueous resin because of its satisfactory surface wetting property.

The resin may be a solvent type resin or an aqueous resin.

Examples of the solvent type resin are acrylic resins, urethane resins, alkyd resins, amino resins, etc. These resins may be used alone or in combinations.

Examples of the aqueous resin are such emulsions as vinyl acetate type emulsion, acrylic type emulsion, urethane type emulsion, etc. and also water-soluble acrylic acid, water-soluble urethane, water-soluble epoxy, water-soluble alkyd, etc. These resins may be used alone or in combinations.

The examples of the paint are oily paints, fiber type derivative paints, synthetic resin paints, rubber derivable paints, aqueous paints, etc.

Examples of the solvent in the solvent type paint are thinner, dimethyl formamide, methylethyl ketone, toluene, isopropyl alcohol, etc.

Depending on the purposes such as quality stabilization and environments of use, to the paint may be added necessary amounts of usual additives used in this field, for instance, a dispersing agent, anti-rusting agent, cross-linking agent, hardening agent, ultraviolet radiation absorbing agent, as well as a processibility improving agent such as a plasticizer, stabilizer, film formation agent, etc., filler, such coloring agents as a die, pigment, quality pigment, etc.

The proportions of the superfine silk fibroin particles and the resin for paint, are in a range of 90 to 1 wt % of superfine silk fibroin particles for 10 to 99 wt % of the resin solids. If the proportion of the superfine powder exceeds 90 wt %, the coating film obtained after drying and fixing may become fragile. If the proportion is less than 1 wt %, the effect of adding the superfine powder cannot be obtained. The superfine powder is suitably dispersed uniformly in the coating film. The superfine powder may be exposed at the surface. This state is useful for improving the sense of touch, sense of warmness and anti-dazzling effect. The paint may be coated on any work of metal, glass, resin, paper, ceramic, wood, etc.

As the paint coating process, an adequate one may be selected such as brush coating, blow coating, electrostatic coating, airless coating, powder coating, etc., dependent on the work to be coated, coating conditions, drying conditions, coating scale, etc.

With the paint according to the invention, it is possible to obtain satisfactory moisture absorbing/releasing property, and attachment of fingerprints or other contaminants is less likely.

This paint has an anti-dazzling effect and does not reflect light, and thus is suited for the interior coating of cars and the like. Further, it provides a settled color tone and thus gives a high grade sense.

Further, the paint according to the invention provides a good sense of touch and is thus suited for the coating of parts touched by the hands, such as electric products and stationary.

The data display surface formation paint according to the invention is obtained by incorporating the superfine silk fibroin particles in paint components.

The paints are roughly classified into those of the solvent type and those of the aqueous type. The invention is applicable to both types of paints. The main paint components are (1) a base resin, (2) solvent, (3) auxiliary agent and (4) pigment. These components are described below.

(1) Base resin

Typical examples of the base resin are acrylic acid, urethane, vinyl, epoxy, cellulose, chlorinated polyolefin, etc. One or more members of this group is selectively used.

Regarding current data display surface formation paints and ordinary paints, those of the aqueous type are being developed in view of environmental and like problems.

As for the data display surface formation paints as well, the resins to be used have to be determined depending on the work to be printed, purpose of the printing, environmental problems and other conditions.

(2) Solvent

The aqueous paints use various solvents such as those of the aliphatic hydrocarbon type, ketone type, alcohol type, aromatic hydrocarbon type, ether type, etc. The solvent to be used is selected depending on the kind of resin used, work to be printed, printing process, purpose of printing, etc., and its content is determined depending on the resin.

(3) Auxiliary agent

The auxiliary agent is selected depending on the purpose of the printing, work to be printed, printing conditions, etc. The purpose of the printing may be strengthening of the physical properties of the coating film, improvement of the setting property, etc.

(4) Pigment

The pigments are usually used to permit discrimination of paints in colors, provide mat tones, etc.

The paint according to the invention may contain individual components in desired proportions, for instance as follows:

Resin component: 5 to 30%

Pigment component: 0 to 40%

Silk fibroin: 5 to 90%

Solvent component: Remainder

The paint according to the invention may be printed on the printing surface of the work by a usual printing process, such as screen printing, gravure printing, flexographic printing, pad printing, etc.

The data display surface formation paint according to the invention can impart the coating film with an excellent moisture absorbing/releasing property because it contains the superfine silk fibroin particles according to the invention. It is thus possible to write anything by superimposition writing on the coating film with a writing tool. In addition, a greatly improved sense of writing is obtainable. Further, the written letters can satisfactorily resist wear.

Further, the coating film obtained with the data display surface formation paint according to the invention has a good sense of touch and is thus suited for home electric products, stationary and other things that are to be touched by people.

Further, it has a matting effect, and thus it is possible to obtain a high grade appearance.

BEST MODES OF CARRYING OUT THE INVENTION

Figure 1:
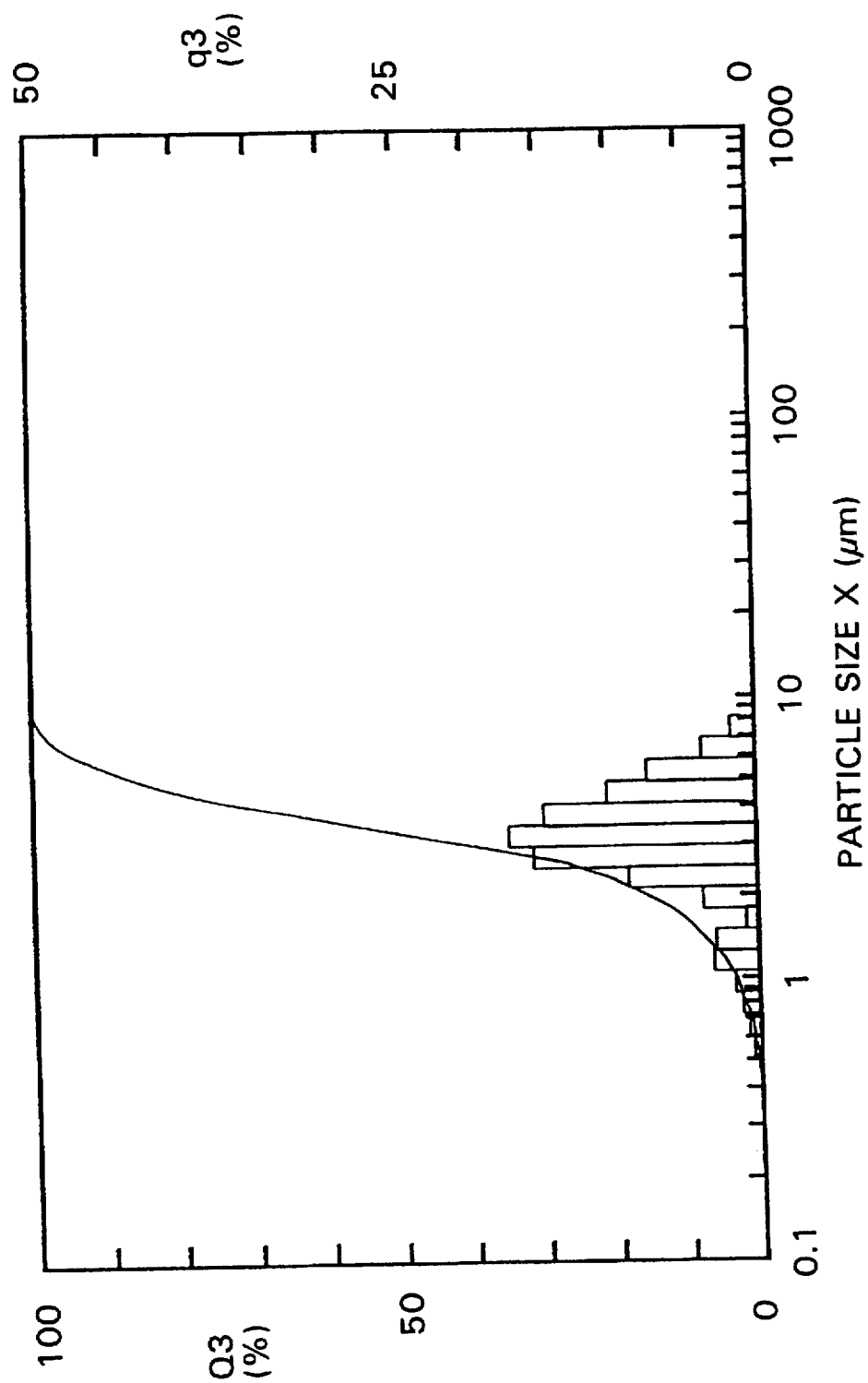
FIG. 1 is a distribution graph regarding the particle size of the silk fibroin ultrafine powder in accordance with the present invention.

Given below are examples of thermoplastic films, laminates and methods of thermoplastic film manufacture embodying the invention.

EXAMPLE 1

Thermoplastic polyurethane is dried at the temperature of 105° C. for four hours, and collagen fine powder (average particle size 5 μm) was dried at the temperature of 120° C. for eight hours, using the hot-air drying machine for both.

Then, materials which consist of 69.4 wt % by weight of dried thermoplastic polyurethane, 30 wt % by weight of dried collagen fine powder, and 0.6 wt % by weight of phenol antioxidant as a heat stabilizer, was kneaded in a biaxial extruding machine and obtained as a compound.

The thus-obtained compound was dried at the temperature of 135° C. for six hours, and further mixed with the thermoplastic polyurethane and the dried collagen fine powder. In the mixture, the rate of the dried compound occupied 30 wt % by weight and the thermoplastic polyurethane occupied 70 wt % by weight. Further, the mixture was dried by a hot-air drying machine in association with a hopper at the temperature of 135° C. and fed into an inflation apparatus to produce a thermoplastic polyurethane film (thickness 30 μm) based on this embodiment. Incidentally, the obtained thermoplastic polyurethane film contained the collagen fine powder in an amount of 9 wt % by weight.

In the manufacturing process, the water content of the fine natural organic material powder before the compound preparation was determined by drying the powder at 120° C. for 4 hours and measuring the resultant weight change. Table 1 represents a result of the occurrence of foams, the time until foreign matter occurs, and anti-blocking performance during the producing steps.

Further, the water content in the compound was measured. The results are shown in Table 3.

The anti-blocking performance was graded by the ease of peeling when molded cylindrical films by the inflation apparatus was opened. The legends of "○", "Δ" and "X" represent the different degrees of anti-blocking performance; "○" means satisfactory state, "Δ" means fair state, and "X" means inferior state.

Then, the thermoplastic polyurethane film which contained the collagen fine powder was graded by the degree of drape and measured for moisture permeability, condensed amount and moisture absorption and discharge amount. Table 2 represents the results regarding the above-mentioned measurements, wherein the drape, that is, touch feeling, softness and so on, was evaluated by ten persons in random. The shown legends in the table represent the different grade of drape; "◉" means excellent state, "○" means satisfactory state, "Δ" means fair state, and "X" means inferior state.

The moisture permeability is measured conforming to Japanese Industrial Standard (JIS) L-1099 A-1.

The measurement procedure of moisture absorption and discharge amount will be explained in detail as follows.

(1) Selecting a film to be tested having an even thickness entirely by directly measuring the thickness of the film. (2) Cutting out the film to have an area of 12 square centimeters. (3) Putting the cut film on an aluminum plate similar in size by means of adhesive-backed tapes to expose a portion thereof having an area of 10 square centimeters. (4) The thus-obtained sample is left as it is for 12 hours in a first thermostatic and hydrostatic chamber in which the temperature is always kept at the temperature of 23° C. and the relative humidity (RH) is also kept constantly at the degree of 30%. (5) Taking out the sample from the first thermostatic and hydrostatic chamber to measure and record the instant weight. (6) Promptly putting the sample into a second thermostatic and hydrostatic chamber (Temperature=30° C., Relative humidity=80%). (7) Measuring and recording the weight of the sample every hour for 4 hours. The difference in the measured weight compared with that in (5) will be the moisture absorption amount. (8) Resetting the sample in the first thermostatic and hydrostatic chamber, and measuring and recording the weight of the sample every hour for 4 hours. The difference in the measured weight compared with the fourth measured weight in (7) will be the moisture discharge amount.

The condensed amount is measured in the following manner.

The measurement is carried out in a laboratory having an atmosphere at the temperature of 23° C. and RH 50% and a filter paper soaking up water therein is placed on a hot plate to generate moisture vapor therefrom. A sample having an area of 10 square centimeters is put on the filter paper to condense the moisture vapor into drops of water thereon. In this process, it should be paid attention not to let escape the moisture vapor through an aperture between the filter paper and the sample resulting from carelessness. This state should be maintained for 10 minutes and then the sample is moved out from inside of the laboratory to collect the drops of water by means of an absorbent paper to thereby measure the change of weight of the absorbent paper.

The overall evaluation in Table 1 is an overall judgment of the molding stability, overall character, moisture absorbing/releasing property, etc. The double circle mark represents "very good", the circle mark represents "good", the triangle mark represents "usual", and the cross mark represents "bad".

EXAMPLES 2–4

In these Examples, the amount of powdered collagen to be applied into the film is changed but other elements are still in the same condition to obtain the respective thermoplastic polyurethane films containing powdered collagen, more particularly, 3 wt % by weight in Example 2, 6 wt % by weight in Example 3 and 35 wt % by weight in Example 4.

EXAMPLE 5

In Example 5, a film was produced in the same way as in Example 1 except for that the fine collagen powder was dried for 3 hours.

EXAMPLE 6

In Example 6, a film was produced in the same way as in Example 1 except for that silk powder with an average particle diameter of 5 μm was used in lieu of the fine collagen powder.

EXAMPLE 7

In Example 7, a film was produced in the same way as in Example 1 except for wood powder (i.e., cellulose powder) with an average particle diameter of 8.2 μm being used in lieu of the fine collagen powder.

EXAMPLE 8

In Example 8, a film was produced in the same way as in Example 1 except for that wool powder was used in lieu of the fine collagen powder.

EXAMPLE 9

In Example 9, a film was produced in the same way as in Example 1 except for that chitin powder was used in lieu of the fine collagen powder.

EXAMPLE 10

Fine collagen powder with an average particle diameter of 5 μm was dried at 120° C. for 8 hours using a hot air drier.

Then, 60 wt % of a chain-like low density polyethylene and 40 wt % of the fine collagen powder were mixed and formed into a compound using a Bumbury's mixer. Then, after drying the compound at 110° C. for 8 hours, 30 wt % of the compound and 70 wt % of chain-like low density polyethylene were mixed to obtain a polyethylene film (30 μm thick) in this example by the T-die molding process. This polyethylene film contained 12 wt % of fine collagen powder.

EXAMPLE 11

In Example 11, a film was produced in the same way as in Example 10 except for using polypropylene in lieu of the chain-like low density polyethylene.

For the films in Examples 2 to 11, as in Example 1, the water content in the fine natural organic material powder prior to the compound preparation was determined, and also a check was made as to whether bubbles were generated during the film formation. Further, of the obtained films, the overall character was evaluated and the moisture absorbing/releasing property, etc. were measured. The results are shown in Tables 1 and 2.

COMPARATIVE EXAMPLE 1

In this comparative example, a film was produced in the same way as in Example 1 except for that the fine collagen powder was not dried.

COMPARATIVE EXAMPLES 2–5

In Comparative Example 2, the thermoplastic polyurethane in Example 1 is dried at the temperature of 105° C. for four hours and includes 3 wt % by weight of the waxing compound as an anti-blocking agent additionally so as to produce the thermoplastic polyurethane film.

In Comparative Example 3, the thermoplastic polyurethane film is obtained from the thermoplastic polyurethane without the waxing compound used in Comparative Example 2.

In Comparative Example 4, the thermoplastic polyurethane film is obtained without the drying process for the compound and the drying process by the drying machine in association with the hopper. The water content in the compound in this process was measured. The results are shown in Table 3.

In Comparative Example 5, the phenol antioxidant as a heat stabilizer used in Example 1 is not employed.

In Comparative Examples 1 to 5, as in Example 1, the water content in the fine natural organic material powder before the compound preparation was measured, and whether bubbles were generated during the film formation, was checked. Further, the overall character of the obtained films was evaluated, and the moisture permeability or the like thereof was measured. The results are shown in Tables 1 and 2. In Comparative Example 3, no film could be obtained due to blocking and, therefore, the overall character evaluation and measurement of the moisture permeability or the like could not be obtained.

As can be seen, the intended film including 45 wt % by weight of powdered collagen does not show an admissible forming stability.

The produced film including powdered collagen having an average particle size over 30 μm contains pinholes or is too poor in molding properties to stably produce the film.

TABLE 1

| | | Moldability | | |
|---|---|---|---|---|
| | Moisture content in fine powder before compound | Foaming phenomenon during molding films | Time until the foreign matter occurs | Anti-blocking performance |
| EXAMPLE | | | | |
| 1 | 0.3 wt % | None | 120 min. | ○ |
| 2 | 0.3 wt % | None | 200 min. | ○ |
| 3 | 0.3 wt % | None | 150 min. | ○ |
| 4 | 0.3 wt % | None | 90 min. | ○ |
| 5 | 4.1 wt % | None | 40 min. | ○ |
| 6 | 0.2 wt % | None | 140 min. | ○ |

TABLE 1-continued

| | | Moldability | | |
|---|---|---|---|---|
| | Moisture content in fine powder before compound | Foaming phenomenon during molding films | Time until the foreign matter occurs | Anti-blocking performance |
| 7 | 0.3 wt % | None | 140 min. | ○ |
| 8 | 0.4 wt % | None | 120 min. | ○ |
| 9 | 0.3 wt % | None | 130 min. | ○ |
| 10 | 0.3 wt % | None | 180 min. | ○ |
| 11 | 0.3 wt % | None | 180 min. | ○ |
| C. EXAM. | | | | |
| 1 | 11.3 wt % | Great | 5 min. | ○ |
| 2 | — | None | Not occurred | ○ |
| 3 | — | None | Not occurred | x |
| 4 | 0.3 wt % | Great | 10 min. | ○ |
| 5 | 0.3 wt % | Medium | 20 min. | ○ |

NOTE: C. EXAM. = Comparative example

TABLE 2

| | Drape | Moisture Permeability (g/m²/24 hr) | Moisture absorption and discharge amount (g/m²) Absorption | Moisture absorption and discharge amount (g/m²) Discharge | Amount of condensation (g/m²) | E-valuation |
|---|---|---|---|---|---|---|
| EXAMPLE | | | | | | |
| 1 | ⊙ | 1700 | 1.5 | 1.4 | 6.6 | ⊙ |
| 2 | ○ | 1580 | 1.1 | 1.1 | 7.1 | ○ |
| 3 | Δ | 1400 | 1.3 | 1.2 | 6.9 | Δ |
| 4 | ○ | 1900 | 1.8 | 1.6 | 6.5 | ○ |
| 5 | ○ | 1690 | 1.2 | 1.2 | 7.0 | ○ |
| 6 | ⊙ | 1600 | 1.3 | 1.3 | 7.0 | ⊙ |
| 7 | ⊙ | 1620 | 1.3 | 1.2 | 7.0 | ⊙ |
| 8 | ⊙ | 1650 | 1.4 | 1.2 | 6.4 | ⊙ |
| 9 | ⊙ | 1600 | 1.4 | 1.3 | 6.8 | ⊙ |
| 10 | ⊙ | — | 1.2 | 1.1 | 7.1 | ⊙ |
| 11 | ⊙ | — | 1.0 | 0.9 | 7.2 | ⊙ |
| C. EXAM. | | | | | | |
| 1 | x (*1) | 1400 | 0.9 | 0.8 | 8.0 | x |
| 2 | x (*2) | 1200 | 0.7 | 0.6 | 9.3 | x |
| 3 | — | — | — | — | — | x |
| 4 | ⊙ | 1660 | 1.1 | 1.0 | 7.1 | Δ |
| 5 | ⊙ | 1670 | 1.4 | 1.3 | 6.8 | Δ |

NOTE
*1: Poor dispersion property
*2: Greasiness
C. EXAM. = Comparative Example

TABLE 3

| | Compound moisture content |
|---|---|
| Example 1 | 0.1 wt % |
| Com. Example 4 | 5.3 wt % |

NOTE: Com. Example = Comparative Example

In accordance with Tables 1 and 2, the produced thermoplastics film is composed of from 1 to 40 wt % by weight of the natural organic substance fine powder which has an average particle size of at most 30 μm and a moisture content of at most 10 wt %, so that it is excellent in drape and shows good results in moisture permeation property, moisture absorption and discharge property and condensation inhibition property.

Further, it will be seen that no bubbles are formed during the film formation, gum generation takes place after the lapse of long time, and satisfactory anti-blocking property is obtainable.

Meanwhile, from Comparative Example 1, it will be seen that because the water content in the fine natural organic material powder exceeds 10 wt %, the dispersion is deteriorated to result in bubble generation during the film formation or reduction of the effect of incorporating the fine natural organic material powder.

As can be seen from the thermoplastics film in Comparative Example 2, it cannot show fine results in moisture permeation property, moisture absorption and discharge property and condensation inhibition property as those in the embodiment, since the waxing compound was additionally applied to the film as an anti-blocking agent.

Reviewing the thermoplastics film in Comparative Example 3, it can be noted that there is employed no additional anti-blocking agent, so that the disadvantage of blocking phenomenon takes place.

From Comparative Example 4, it will be seen that because the compound is not dried, the water content therein is high compared to the case of Example 1, bubble generation takes place during the film formation, and the time until the gum generation is reduced.

In Comparative Example 5, since the phenol antioxidant or heat stabilizer is not additionally applied, the time until the occurrence of the foreign matter becomes short.

EXAMPLE 12

Fine collagen powder (with an average particle diameter of 5 μm) was dried at 120° C. for 8 hours using the hot air drier.

Then, 80 wt % of a chain-like low density polyethylene and 20 wt % of the fine collagen powder were mixed to produce a compound using the Bumbury's mixer. Then, a polyethylene film (30 μm thickness) in this example was formed from the compound using the calender molding process. The polyethylene film contained 20 wt % of fine collagen powder.

As in Example 1, the water content in the fine natural organic material powder before the compound formation was measured, and further the state of dispersion of the fine powder in the film and the overall character thereof were evaluated. The results are shown in Table 4. In the fine powder dispersion state column in Table 4, the double circle mark represents "very satisfactory dispersion state", and the cross mark represents "unsatisfactory dispersion state".

COMPARATIVE EXAMPLE 6

In this Comparative Example, a film was produced in the same way as in Example 12 except for that the fine collagen powder was not dried.

As in Example 12, the characteristics measurement and evaluation were made. The results are shown in Table 4.

TABLE 4

| | Water content of fine powder before compound | State of dispersion of fine particles | Overall character | Overall evaluation |
|---|---|---|---|---|
| Example 12 | 0.3 wt % | ⊙ | ⊙ | ⊙ |
| Com. Ex. | 14.1 wt % | x | x | x |

From Table 4, it will be seen that the polyethylene film in Example 12 has satisfactory characteristics because the film uses dry fine collagen powder with a lower water content although it is formed by the calender molding process.

On the other hand, the polyethylene film in Comparative Example 6 has unsatisfactory characteristics because it uses fine collagen powder which is not dried and contains a high water content.

EXAMPLE 13

A laminate with a thermoplastic layer was produced by bonding the film obtained in Example 1 with a dry laminate urethane type adhesive to a base material which was a woven cloth of blend spun fibers of 50% nylon and 50% ester.

COMPARATIVE EXAMPLE 7

A laminate was produced in the method in Example 13 by using the polyurethane film produced in Comparative Example 1.

With the laminates in Example 13 and Comparative Example 7, as in Example 1, the character evaluation and the absorbed and released moisture measurements were made. The results are shown in Table 5.

TABLE 5

|  | Overall character | Moisture absorption and releasing (g/m²) | | Overall evaluation |
| --- | --- | --- | --- | --- |
|  |  | Absorption | Releasing |  |
| Example 13 | ⊙ | 22.0 | 21.9 | ⊙ |
| Com. Ex. 7 | x | 12.0 | 11.5 | x |

From Table 5, it will be seen that the laminate in Example 13 has a satisfactory overall character and moisture absorbing/releasing property because it has as its one layer the film obtained in Example 1.

On the other hand, the laminate in Comparative Example 7 has an unsatisfactory overall character and moisture absorbing/releasing property because it has as its one layer the film obtained in Comparative Example 1.

The followings are the preferable Examples of coating materials forming an information display surface.

EXAMPLE 14

A coating material forming an information display surface is firstly prepared by mixing the following several materials; chlorination polyolefin, etc. as a base resin 20 wt % by weight, aromatic series solvent medium as a solvent medium 45 wt % by weight, anti-foaming agent, etc. as an auxiliary 0.02 wt % by weight, calcium carbonate 5 wt % by weight as a pigment, and silk fine powder as a natural organic substance fine powder (average particle diameter 7 μm) 30 wt % by weight.

The prepared coating material is layered on a polycarbonate board at a thickness of 0.5 mm to obtain a sample to be evaluated regarding the printing result, dried degree, adhesion, and organoleptic evaluation. The evaluation result will be shown in the following Tables 6–9.

The printing result, dried degree and organoleptic evaluation will be classified into 5 states, i.e., 5— Excellent, 4—Satisfactory, 3—Fair, 2—Inferior, 1—Quite inadequate as shown in Tables.

The evaluation test for adhesion is conducted by applying a hardwearing properties test, in which the surface of the prepared sample is rubbed once by a shirting (member of cotton cloth for rubbing) to which a weighting of 100 g is applied.

As the tested writing materials, there are prepared three kinds of writing materials such as a X-Y plotter (aqueous ink), fiber pen and felt pen (aqueous, oiliness).

The used X-Y plotter is named WX2400 and produced by Graphic Company, of which the feeding speed of the recording chart is set at 1 cm/second and the input range is 0.5 V.

The evaluation test regarding the organoleptic evaluation such as touch feeling, write feeling, clarity of letters were conducted by 12 ordinary persons selected at random.

EXAMPLES 15–17

The coating material forming information display surface prepared in Example 15 uses a silk fine powder having an average particle diameter of 3 μm instead of the fine powder used in Example 14.

The coating material forming an information display surface prepared in Example 15 is obtained by preparing or loading 4 wt % by weight of the hydrophilic nature silica (average particle diameter is at most 3 μm) into the powder used in Example 14.

The coating material forming an information display surface in accordance with Example 17 uses a collagen fine powder which can be prepared by processing the fine powder used in Example 14 so as to have an average particle diameter of 7 μm.

These samples in the respective Examples are also evaluated as Example 14 regarding printing result, dried degree, adhesion and organoleptic evaluation, of which results are shown in Tables 6–9.

COMPARATIVE EXAMPLES 8, 9

The coating material forming an information display surface prepared in Comparative Example 8 is obtained by omitting the silk fine powder in Example 14.

The coating material forming an information display surface in accordance with Comparative Example 9 is prepared by changing the fine powder used in Example 14 to a hydrophilic nature silica having an average particle diameter of at most 3 μm.

These samples in the respective Comparative Examples are also evaluated as Example 14 regarding printing result, dried degree, adhesion and organoleptic evaluation, of which the results are shown in Tables 6–9.

TABLE 6

| Properties in the X—Y plotter | | | |
| --- | --- | --- | --- |
|  | PRINTING RESULT | DRIED DEGREE | ADHESION AFTER 4 HOURS |
| EXAMPLE 14 | 3 | 3 | COMPLETE |
| EXAMPLE 15 | 4 | 4 | COMPLETE |
| EXAMPLE 16 | 5 | 5 | COMPLETE |
| EXAMPLE 17 | 3 | 4 | COMPLETE |
| COM. EXAMPLE 8 | 1 | 1 | INSUFFICIENT DUE TO NON-DRY |
| COM. EXAMPLE 9 | 3 | 2 | INSUFFICIENT DUE TO SHORT DRY |

Note: "COM. EXAMPLE" means "COMPARATIVE EXAMPLE"

TABLE 7

Properties in the fiber pen

|  | PRINTING RESULT | DRIED DEGREE | ADHESION AFTER 1 HOUR | DRYING TIME |
|---|---|---|---|---|
| EXAMPLE 14 | 3 | 4 | COMPLETE | AT MOST 6 HOURS |
| EXAMPLE 15 | 4 | 4 | COMPLETE | AT MOST 6 HOURS |
| EXAMPLE 16 | 5 | 5 | COMPLETE | AT MOST 6 HOURS |
| EXAMPLE 17 | 3 | 3 | COMPLETE | AT MOST 6 HOURS |
| COM. EXAMPLE 8 | 1 | 1 | INSUFFICIENT DUE TO NON-DRY | NON-DRY AFTER 24 HOURS |
| COM. EXAMPLE 9 | 3 | 2 | INSUFFICIENT DUE TO SHORT DRY | NON-DRY AFTER 24 HOURS |

Note: "COM. EXAMPLE" means "COMPARATIVE EXAMPLE"

TABLE 8

Properties in the felt pen

|  | OILY FELT PEN | | AQUEOUS FELT PEN | |
|---|---|---|---|---|
|  | DRIED DEGREE | CLARITY | DRIED DEGREE | CLARITY |
| EXAMPLE 14 | 3 | 3 | 3 | 3 |
| EXAMPLE 15 | 3 | 4 | 4 | 3 |
| EXAMPLE 16 | 3 | 5 | 5 | 5 |
| EXAMPLE 17 | 3 | 3 | 3 | 3 |
| COM. EXAMPLE 8 | 3 | 1 | 1 | 1 |
| COM. EXAMPLE 9 | 3 | 2 | 2 | 3 |

Note: "COM. EXAMPLE" means "COMPARATIVE EXAMPLE"

TABLE 9

Organoleptic evaluation

|  | TOUCH FEELING | WRITE FEELING | CLARITY OF WRITTEN LETTER |
|---|---|---|---|
| EXAMPLE 14 | 4 | 4 | 3 |
| EXAMPLE 15 | 5 | 5 | 3 |
| EXAMPLE 16 | 3 | 4 | 5 |
| EXAMPLE 17 | 4 | 4 | 3 |
| COM. EXAMPLE 8 | 1 | 1 | 1 |
| COM. EXAMPLE 9 | 2 | 2 | 3 |

Note: "COM. EXAMPLE" means "COMPARATIVE EXAMPLE"

As can be understood from the above properties, the coating material forming an information display surface in accordance with the Examples 14–21 shows good results in printing, dried degree, adhesion and organoleptic evaluation since they contain the silk fine powder or the collagen fine powder, respectively. In accordance with Example 16, the properties can be improved when the natural organic substance fine powder along with the silica is applied.

But, inspecting the coating material forming an information display surface in Comparative Example 8, they do not show good results in printing, dried degree, adhesion and organoleptic evaluation since they do not contain the natural organic substance fine powder.

In accordance with the coating material forming an information display surface in Comparative Example 9, since the natural inorganic substance fine powder is contained instead of the natural organic substance fine powder, the excellent results as in the natural organic substance fine powder cannot be obtained.

Though the coating material forming an information display surface in Examples 14–21 uses the silk fine powder or the collagen fine powder selected from the natural organic substance fine powders in accordance with the present invention, the same effect can be achieved by keratin fine powder, wool fine powder, cellulose fine powder, cotton fine powder, hemp yarn fine powder, chitin fine powder, chitosan fine powder other than the natural organic substance fine powder.

The coating materials forming an information display surface using these fine powders are also evaluated regarding printing result and adhesion as in Examples 14–21, which is shown in Table 10. The column of "EVALUATION" should be understood as to be an overall evaluation based on items such as clarity of written letters, dried degree, adhesion (abrasion resistance). The evaluation standards are the same as in the above-mentioned printing result.

TABLE 10

Properties in several powders

| KIND OF POWDER | PRINTING RESULT | ADHESION AFTER 1 HOUR | EVALUATION |
|---|---|---|---|
| KERATIN | GOOD | DRIED, FIXED | 4 |
| WOOL | GOOD | DRIED, FIXED | 4 |
| CELLULOSE | GOOD | DRIED, FIXED | 4 |
| COTTON | GOOD | DRIED, FIXED | 4 |
| HEMP YARN | GOOD | DRIED, FIXED | 4 |

The followings are Examples of products having surfaces to be written on.

EXAMPLE 18

In this Example, a cowhide after aldehyde tanning to keep its brightness is used. The cowhide is crushed and degreased and then deformed into a collagen fine powder having an average particle diameter of 15 μm through another crushing process, fine process and ultrafine process.

The coating material is formed by several materials such as a polyester resin as a base resin by 20 phr, an aromatic series solvent medium (inflammation point 47° C.) as a solvent medium by 45 phr, $TiO_2$ and talc as pigments by 2.5 phr respectively and the collagen fine powder as a natural organic substance fine powder by 30 phr.

Incidentally, the compound ratio can be adjusted to the following range, that is, when 5 phr of pigment and 20 phr of base resin will be compounded, the natural organic substance fine powder will be about from 5 to 100 phr, preferably from 20 to 40 phr, and the solvent medium will be from 20 to 40 phr, preferably 45 phr.

The above-mentioned coating material will be screen printing on a polycarbonate plate as a sample of a product. The screen should be understood to be defined by 180 meshmonofilament. The coating film is subjected to a drying process for 20 minutes at 60° C. to obtain a sample product formed with a surface to be written on in this Example.

The formed surface to be written on of this sample will be evaluated regarding its repellent property, dried degree, touch feeling, write feeling and pad printing suitability. Those results will be shown in Table 11. The repellent property evaluates how the ink is shed when writing letters on the surface to be written on by means of an aqueous ink pen and ball point pen. The legend "○" means non-presence of repellent state and "X" indicates presence of repellent state.

The dried degree is evaluated such that after writing letters on the surface to be written on by means of an aqueous ink pen and ball point pen, how the surface will be stained when rubbing with a pressure of 100 g due to an unstable state of the ink on the surface to be written on. The evaluation of the dried degree is indicated by three legends; "○" means enough, "Δ" means average and "X" means insufficient.

The touch feeling is evaluated by 10 male and female persons when touching the surface to be written. The legend

EXAMPLES 19–21

In Example 19, the natural organic substance fine powder in Example 18 is deformed into a collagen fine powder state having an average particle diameter of 6 μm but other items are the same to thereby obtain a sample of a product having a surface to be written on.

In Example 20, the natural organic substance fine powder in Example 18 is deformed into a collagen fine powder having an average particle diameter of 3 μm but other items are the same to thereby obtain a sample of a product having a surface to be written on.

In Example 21, the natural organic substance fine powder in Example 18 is deformed into a silk fine powder having an average particle diameter of 5 μm but other items are the same to thereby obtain a sample of product having a surface to be written on.

The surfaces of the samples of the respective examples are also evaluated regarding several properties as Example 18, of which results are shown in Table 11.

COMPARATIVE EXAMPLES 10, 11

In Comparative Example 10, the coating material is prepared without the natural organic substance fine powder in Example 18 to obtain a sample product having surface to be written on.

In Comparative Example 11, the natural organic substance fine powder used in Example 18 is made a silica fine powder having an average particle diameter of 5 μm to obtain a sample product having a surface to be written on.

The surfaces of the samples prepared in the comparative examples are also evaluated regarding several properties, as was Example 18, of which results are shown in Table 11.

TABLE 11

| | REPELLENT PROPERTY | | DRIED DEGREE | | | | | |
|---|---|---|---|---|---|---|---|---|
| | INK PEN | BALL POINT PEN | INK PEN | BALL POINT PEN | TOUCH FEELING | WRITE FEELING | PAD PRINTING SUITABILITY | E-VALU-ATION |
| EXAMPLE 18 | ○ | ○ | ○ | ○ | ○ | Δ | Δ | ○ |
| EXAMPLE 19 | ○ | ○ | ○ | ○ | ○ | ○ | Δ | ○ |
| EXAMPLE 20 | ○ | ○ | ○ | ○ | ◎ | ◎ | ○ | |
| EXAMPLE 21 | ○ | ○ | ○ | ○ | ○ | ○ | Δ | ○ |
| COM. EXAMPLE 10 | x | ○ | x | x | Δ | x | ○ | x |
| COM. EXAMPLE 11 | ○ | ○ | Δ | Δ | Δ | Δ | Δ | Δ |

Note: "COM. EXAMPLE" means "COMPARATIVE EXAMPLE"

"◎" means excellent, "○" means fine, "Δ" means average and "X" means uncomfortable.

The write feeling is evaluated by 10 male and female persons when writing letters on the surface to be written on. The legend "◎" means excellent, "○" means fine, "Δ" means average and "X" means uncomfortable.

The pad printing suitability is classified by "○" meaning fine, "Δ" meaning average and "X" meaning insufficient.

The column of "EVALUATION" is classified by "◎" meaning excellent, "○" meaning fine, "Δ" meaning average and "X" meaning uncomfortable.

As can be expected from evaluations regarding properties, in accordance with products having surfaces to be written on, the coating material of the surface to be written on contains collagen fine powder of silk fine powder and shows sufficient results regarding repellent property, dried degree, touch feeling, write feeling and pad printing suitability.

According to Examples 18–20, by using small collagen fine powder having an average particle diameter of about 3 μm, the touch feeling and write feeling will be improved.

While, in accordance with the product having the surface to be written on in Comparative Example 10, there is no natural organic substance fine powder in the coating material of the surface to be written on, so that it can be understood that a repellent property when writing with an aqueous ink pen, a dried degree and write feeling when writing an aqueous ink pen and ball point pen are not good.

In accordance with the product having a surface to be written on in Comparative Example 11, the fine powder contained in the coating material of the surface to be written on is not a natural organic substance fine powder but a natural inorganic substance fine powder, so that it can be understood that a dried degree, touch feeling and write feeling are poor compared with those containing a natural organic substance fine powder.

Herein under are given examples concerning the method of manufacturing superfine silk fibroin particles and the superfine powder obtained by the same method.

EXAMPLE 22

The details of the method of producing silk fibroin ultrafine powder of the preferable embodiment in accordance with the present invention and a film using the produced ultrafine powder are discussed.

A raw silk is first cut to about 2 to 3 centimeters length by means of a cutting blade mill and is then soaked in just warm water or warm water containing oxygen to be refined to thereby produce silk fibroin material without any sericin. It should be noted that a material of silk fibroin without refining may affect the final powder so as to have poor touch feeling and be colored into lean brown color.

The cut silk fibroin is pulverized into a silk fibroin crushed powder state having an average particle diameter of 100 μm by a rotary blade mill (Orient vertical type pulverizing machine VM-32 (trademark) produced by ORIENT CO., LTD.) and the silk fibroin crushed powder is fed into a streaming drying machine to be dried at a temperature of 100° C. for 6 hours.

The temperature for the drying process should be at most 130° C., preferably from 90°–110° C. Higher temperature over 130° C. may cause a change of color. The operating time should be over one hour. A short drying process will severely harm the color of the powder when pulverized in a ball mill having a wall made of stainless steel, making the powder be worn away. However, if the wall of the ball mill is made of another material such as a ceramic, which will not harm the color of the powder, the above mentioned drying process can be obviated.

Incidentally, the particle size of the powder is measured by means of a laser rotating type particle-size analyzer (SK LASER PRO 7000S (trademark) made of SEISIN CO., LTD., dispersion medium: ethanol, dispersion condition: supersonic wave 60 seconds).

The silk fibroin crushed powder is further pulverized for 12 hours by means of a ball mill (made by KONDO CHEMICAL MACHINE MANUFACTURE CO., LTD.) to obtain silk fibroin fine powder having an average particle diameter of about 20 μm. This ball mill has a ceramic wall and a ball made of aluminum to prevent the color change of the powder. The average particle diameter can be smaller than 20 μm by means of the same ball mill, otherwise the powder will be pulverized by a later jet mill. However, in view of working efficiency, the pulverizing process by the ball mill should be complete when the average particle diameter reaches about 20 μm. Further pulverization by the ball mill to obtain smaller particles will take much more time and does not effect the particle diameter after being pulverized in the jet mill.

The silk fibroin fine powder in the ball mill is transmitted into a chamber, into which methanol is poured and stirred for one hour at room temperature to improve the crystallinity index by beta treatment. The silk fibroin fine powder is then removed and dried. The beta treatment is necessary for the obtained powder to disperse well in the resin solution to produce the goods.

This silk fibroin fine powder is pulverized in the jet mill (Single truck jet mill (trademark) produced by SEISHIN CO., LTD.) to become ultrafine powder having an average particle diameter of 3.252 μm. The handled volume of powder in this pulverizing is 5 kg/h.

FIG. 1 is a distribution graph regarding the particle size of the silk fibroin ultrafine powder in accordance with the present invention. In the drawing, the graph curve is the cumulative sum weight $Q_3$ and the bar graph is the weight frequency $q_3$.

The silk fibroin ultrafine powder is combined with a urethane solvent (Rezamin ME3612LP (trademark) produced by DAI NICHI SEIKAKOGYO CO., LTD.) which is diluted by dimethylformamide/methyl ethyl ketone=1/1 so as to occupy 30 wt % by weight, based on resin solids content, and is then applied to a peelable paper pattern by using a roll bar, at a thickness of 30 μm. The solvent medium in the applied coating is completely evaporated in a drying operation and then the formed film is peeled off from the peelable pattern paper as a film containing ultrafine powder in accordance with the present invention.

The respective films are measured for moisture absorption amount, moisture discharge amount, moisture permeability and frictional electrification voltage and organoleptic evaluations have been also conducted. Those results are shown in Tables 12 and 13.

The measurement of moisture discharge amount will be done as follows.

(1) Selecting a film to be tested having an even thickness by directly measuring the thickness of the film. (2) Cutting out the film to have an area of 12 square centimeters. (3) Putting the cut film on an aluminum plate having a similar size by means of adhesive-backed tapes to expose a part portion thereof having an area of 10 square centimeters. (4) The thus-obtained sample is left as it is for at least 12 hours in a first thermostatic and hydrostatic chamber in which the temperature is always kept at the temperature of 23° C. and the relative humidity (RH) is also kept constantly at the degree of 30%. (5) Taking out the sample from the first thermostatic and hydrostatic chamber to measure and record the instant weight. (6) Promptly putting the sample into a second thermostatic and hydrostatic chamber (Temperature= 30° C., Relative humidity=80%). (7) Measuring and recording the weight of the sample every hour for 4 hours. The difference in the measured weight compared with that in (5) is the moisture absorption amount. (8) Resetting the sample in the first thermostatic and hydrostatic chamber, and measuring and recording the weight of the sample every hour for 4 hours. The difference in the measured weight compared with the fourth measured weight in (7) is the moisture discharge amount.

The moisture permeability is measured according to Japanese Industrial Standard (JIS) L-1099.

The organoleptic evaluation was made by twenty persons in random who touch the film in this preferable embodiment. Each mark in the table should be considered as the mean value of the twenty people. The marking is conducted out of 5 grades. Mark 5 . . . Excellent touch feeling, Mark 4 . . . Satisfactory touch feeling, Mark 3 . . . Fair touch feeling, Mark 2 . . . Inferior touch feeling, and Mark 1 . . . Worst touch feeling.

The frictional electrification voltage is measured according to Japanese Industrial Standard (JIS) L-1094B.

Another film of a comparative example not containing ultrafine powder in accordance with the preferred embodiment is also prepared and is measured and evaluated for several properties as in the above-mentioned embodiment. The results are shown in the following Tables 12 and 13.

TABLE 12

| | Absorbed Water (g/m³) | | | | Discharged Water (g/m³) | | | |
|---|---|---|---|---|---|---|---|---|
| | 1 hour | 2 hour | 3 hour | 4 hour | 1 hour | 2 hour | 3 hour | 4 hour |
| Example 22 | 4.1 | 5.9 | 6.9 | 8.5 | 2.8 | 4.1 | 4.9 | 5.8 |
| Com. Example 12 | 2.8 | 4.4 | 5.3 | 6.3 | 2.0 | 3.2 | 3.8 | 4.5 |

Note: Com. Example means Comparative Example

TABLE 13

| | Moisture Permeability (mg/m²/24 hr) | Organoleptic evaluation | Frictional electrification voltage (v) |
|---|---|---|---|
| Example 22 | 2000 | 4.2 | 425 |
| Com. Example 12 | 1400 | 2.3 | 3250 |

Note: Com. Example means Comparative Example

Reviewing the measurement and evaluation results, it can be noted that the film using ultrafine powder produced by the method in accordance with Example 22 is a silk fibroin ultrafine powder after beta treatment by which the ultrafine powder is well dispersed in the film, so that the obtained film is fine in moisture absorption, discharge property and antistatic properties and provides a comfortable touch feeling and further maintains the drape of natural silk.

On the other hand, since the film prepared in the comparative example does not contain silk fibroin ultrafine powder, it is inferior in moisture absorption, discharge property and anti-static properties. The touch feeling is not comfortable either.

The respective crystallinity index of fibroin ultrafine powders A, B, C and natural silk thread are measured, the fibroin ultrafine powders A and B being processed by the beta treatment by the method according to the preferable embodiment and the fibroin ultrafine powder C being processed only without beta treatment. The crystallinity index of the fibroin ultrafine powders A, B, C to natural silk thread is shown in Table 14.

The crystallinity index is measured in conformity with X-ray analysis (Blag angle $2\Theta = 5°\sim45°$).

The dispersion property in respective solvent mediums of A, B, C is evaluated in the following Table 14, in which "○" means a fine state, "Δ" means an inferior state, "X" means a condensation state.

TABLE 14

| | Crystallinity index against natural silk thread | Dispersion property in solvent medium | | | |
|---|---|---|---|---|---|
| | | Water | DMF | MEK | MeOH |
| A | 81.25% | ○ | ○ | ○ | ○ |
| B | 74.30% | ○ | ○ | ○ | ○ |
| C | 68.75% | Δ | x | x | Δ |

Reviewing Table 14, the fibroin ultrafine powder obtained by the method of the preferred embodiment has a large crystallinity index compared to natural silk thread after the beta treatment and shows an improved dispersion property in the solvent medium.

In another Comparative Example, a film using ultrafine powder which is produced without the beta treatment as in the above mentioned embodiment is tested, however, the condensation state of the ultrafine powder comes into play and disturbs the production of the film because the ultrafine powder could not disperse uniformly in the solvent medium resin.

Examples of solvent type resin compositions, films or sheets containing superfine silk fibroin particles and laminates using the same are given below.

EXAMPLE 23

The superfine silk fibroin particles used in this example was obtained in the same way as in Example 22.

90 wt % of the solids of a polyurethane solution ("Rezamine 3612LP" manufactured by Dainichi Seika Co., Ltd.) and 10 wt % of superfine silk fibroin particles were mixed to obtain a blended resin solution (with 20 wt % of solids), which was coated on a separable paper using a coater and then dried at 70° C. to form a film with a thickness of 30 μm.

EXAMPLE 24

A film was produced in the same way as in Example 23 except that 30 wt % of superfine silk fibroin particles was mixed with 70 wt % of the polyurethane solution.

EXAMPLE 25

A film was produced in the same way as in Example 23 except that 50 wt % of polyurethane solution solids and 50 wt % of superfine silk fibroin particles were mixed.

EXAMPLE 26

Figure 2:
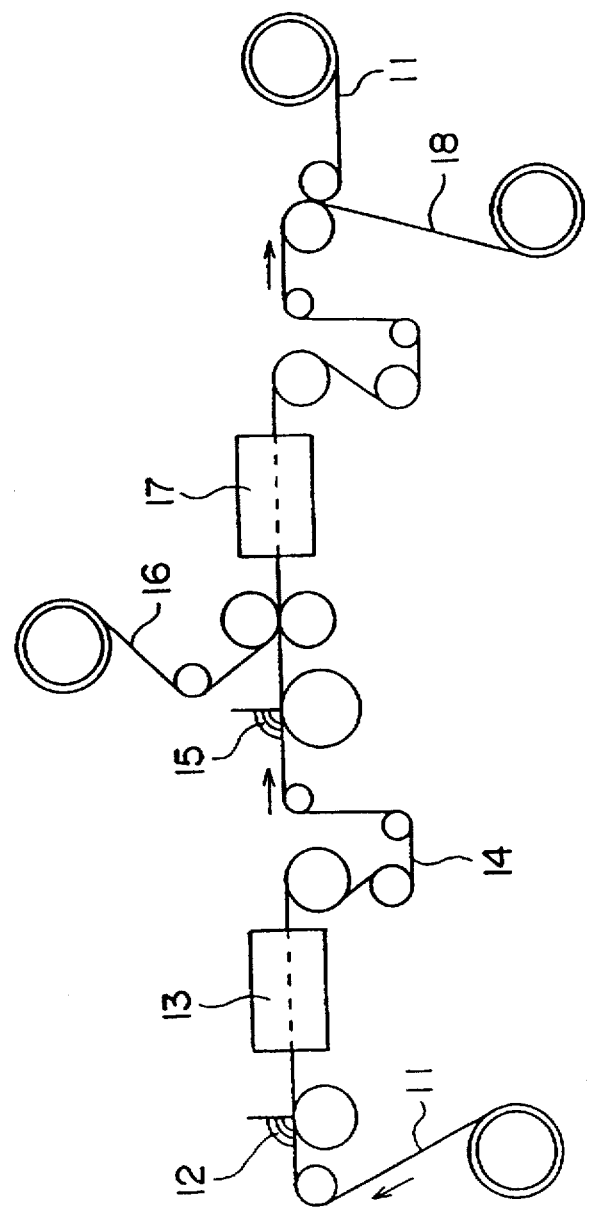
FIG. 2 is a schematic view showing a dry coating apparatus used in an embodiment of the invention.
Figure 3:
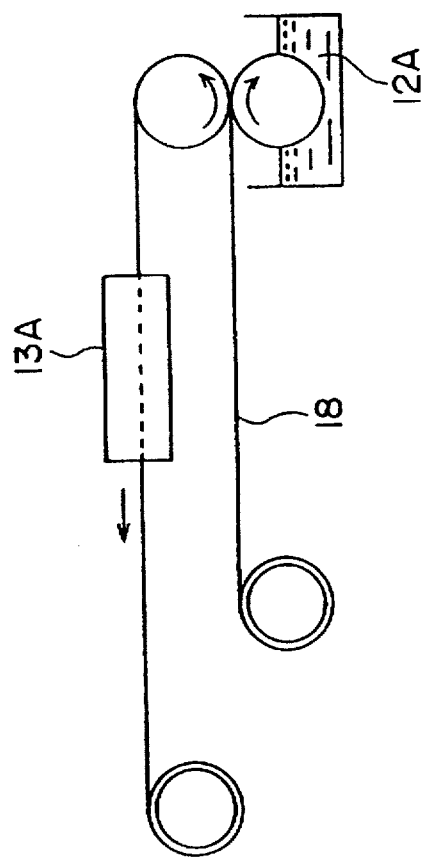
FIG. 3 is a schematic view showing a gravure coating apparatus used in an embodiment of the invention.

A coating solution (i.e., a solution prepared by adding slight amounts of additives to a dry polyurethane resin solution obtained by incorporating 6 wt % of superfine silk fibroin particles) 12 was coated on a separable paper sheet 11 using a dry coating apparatus as shown in FIG. 2, and then dried using a drier 13 at 130° C. to produce a polyurethane film 14 with a thickness of 20 μm and containing superfine silk fibroin particles.

Then, the film 14 was bonded to a base material 16 constituted by a non-woven cloth of polyester of one denier and weighing 70 g/m² by using an adhesive (i.e., a polyurethane adhesive containing 5 wt % of superfine silk fibroin particles, based on the solids content) 15, followed by drying at 140° C. using a drier 17 to produce a synthetic leather 18 having a polyurethane resin layer 40 μm thick and containing superfine silk fibroin particles. Then, a coating solution (i.e., a polyurethane resin solution containing 5 wt % of superfine silk fibroin particles on a solids basis) 12A was coated on the surface of the synthetic leather 18 and then dried using a drier 13A.

EXAMPLE 27

Figure 4:
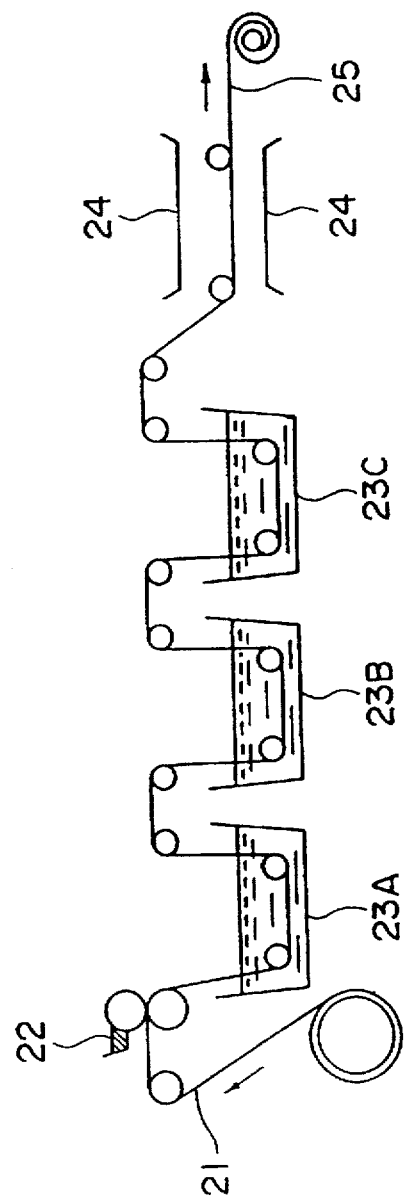
FIG. 4 is a schematic view showing a wet coating apparatus in an embodiment of the invention.

A coating solution (i.e., a solution obtained by adding a small amount of a filler to a wet polyurethane resin solution containing 30 wt % of superfine silk fibroin particles on a solids) 22 was coated on a base material 21 constituted by a woven cloth of blended spun fibers of 50% nylon and 50% Teflon using a wet coating apparatus as shown in FIG. 4. The base material 21 is then passed continuously through solidifying/water washing vessels 23A to 23C and then dried using a drier 24 at 140° C. to produce a synthetic leather 25 having an ester type polyurethane resin layer with a thickness of 0.70 mm and containing superfine silk fibroin powder. Then, a coating solution (i.e., a polyurethane resin solution containing 30 wt % of superfine silk fibroin particles on a solids basis) was coated by spray coating on the synthetic leather 25.

EXAMPLE 28

Figure 5:
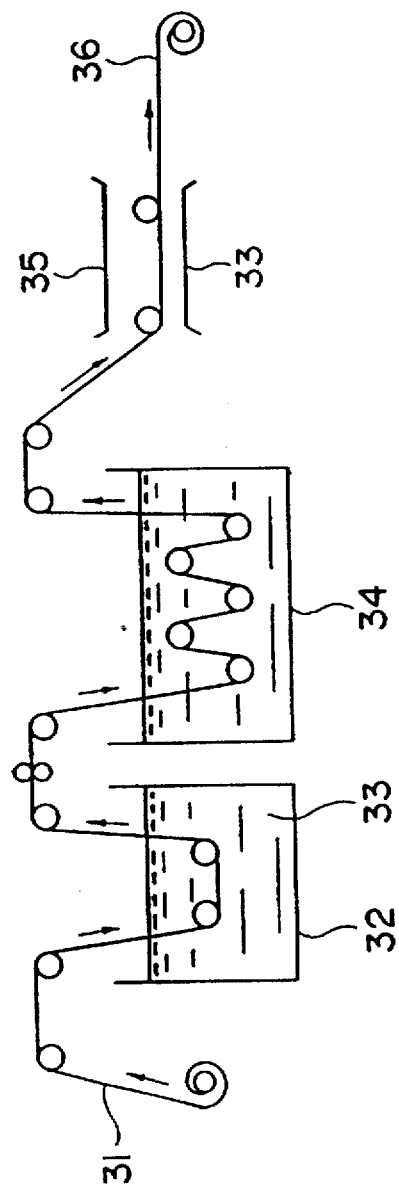
FIG. 5 is a schematic view showing an impregnation coating apparatus in an embodiment of the invention.

An impregnation coating apparatus as shown in FIG. 5 was used. A base material 31 constituted by non-woven polyester cloth of 2 denier and weighing 70 g/m² was introduced into an impregnation vessel 32 for impregnation with 30 g/m² by dry weight of an impregnating solution (i.e., a solution obtained by adding 3 wt. parts of a filler to an ester type polyurethane resin solution (with 15 wt % of resin solids) containing 25 wt % of superfine silk fibroin particles on a solids basis) 33. Then, the base material 31 was passed through a solidifying/water washing vessel 34 and then dried using a drier 35 at 130° C. to obtain an impregnated base material 36.

Then, using the impregnation coating apparatus as shown in FIG. 5, the impregnated base material 36 was coated with a coating solution (i.e., a solution obtained by adding a filler and a foaming agent to an ester type polyurethane resin solution (with 15 wt. % of resin solids) containing 30 wt. % of superfine silk fibroin on a solids basis) and then introduced into solidifying/water washing vessels 23A to 23C, followed by drying using a drier 24 at 130° C. Thus, an artificial leather was obtained which had a porous polyurethane resin layer with a thickness of 0.4 mm.

COMPARATIVE EXAMPLE 13

A film was produced in the same way as in Example 23 except that the superfine silk fibroin particles according to the invention was not used.

COMPARATIVE EXAMPLES 14 TO 16

In Comparative Examples 14 to 16, a sheet, a synthetic leather and an artificial leather were produced in the same ways as in Examples 26 to 28, respectively, except for that the superfine silk fibroin particles according to the invention was not used.

Then, with the film, sheet, synthetic leather and artificial leather in Examples 23 to 28 and Comparative Examples 13 to 16, the moisture permeability, absorbed moisture amount, released moisture amount or sense of surface touch was tested. The results are shown in Tables 15 and 16. The tests were conducted by the following methods.

The absorbed moisture amount was determined by measuring the weight increase of the sample by holding one side thereof (i.e., either side in case of single layer sample but the side opposite the base material in case of sample comprising two or more layers) in an atmosphere at 23° C. and 80% RH, the sample having reached equilibrium at 23° C. and 30% RH.

The released moisture amount was determined by measuring the weight reduction of the sample by holding one side thereof (the measurement side being the same as in the case of the absorbed moisture amount) in an atmosphere at 23° C. and 30% RH, the sample having reached equilibrium at 23° C. and 80% RH.

The moisture permeability and the surface touch sense were measured in the same ways as in Example 22.

TABLE 15

| | Superfine silk fibroin (wt %) | Moisture permeability (g/m² 24 hrs.) | Absorbed moisture (g/m²) 2 hrs. | Surface touch sense |
|---|---|---|---|---|
| Example 23 | 10 | 1200 | 0.4 | 3.85 |
| Com. Ex. 13 | 0 | 900 | 0.2 | 2.80 |
| Example 24 | 30 | 1700 | 0.7 | 4.45 |
| Example 25 | 50 | 2900 | 0.9 | 4.70 |

TABLE 16

| | Superfine silk fibroin (wt %) | Absorbed moisture amount (g/m²) | | | Released moisture amount (g/m²) | | |
|---|---|---|---|---|---|---|---|
| | | 20 min. | 1 hr. | 24 hrs. | 20 min. | 1 hr. | 24 hrs. |
| Example 26 | 6 | 2.2 | 3.6 | 5.0 | 2.0 | 3.0 | 4.3 |
| Com. Ex. 14 | 0 | 0.8 | 1.2 | 2.3 | 0.8 | 1.2 | 1.8 |
| Example 27 | 30 | 12.0 | 15.5 | 22.0 | 10.5 | 16.0 | 22.0 |
| Com. Ex. 15 | 0 | 8.2 | 10.4 | 12.0 | 7.0 | 9.0 | 11.5 |
| Example 28 | 25, 30 | 8.5 | 10.0 | 13.0 | 7.8 | 9.8 | 13.0 |
| Com. Ex. 16 | 0, 0 | 3.2 | 4.0 | 5.5 | 3.0 | 4.0 | 5.4 |

From Tables 15 and 16, it will be seen that the film, sheet, synthetic leather and artificial leather in Examples 23 to 28 have satisfactory characteristics such as moisture permeability, moisture absorption, moisture releasing and surface touch sense because they contain superfine silk fibroin particles according to the invention.

On the other hand, the film, sheet, synthetic leather and artificial leather in Comparative Examples 13 to 16, as seen from Tables 15 and 16, have unsatisfactory characteristics with respect to moisture permeability, moisture absorption, moisture releasing and surface touch sense because they do not contain superfine silk fibroin according to the invention.

Herein under are given examples of thermoplastic resin compositions, films and sheets containing superfine silk fibroin particles and laminates using the same.

EXAMPLE 29

The superfine silk fibroin particles used in this example was obtained in the same way as in Example 22.

Using a hot air drier, thermoplastic polyurethane ("Estoran C85A11FG", a trade name, manufactured by Takeda Bardish Urethane Industries, Inc.) was dried at 105° C. for 4 hours, and superfine silk fibroin particles was dried at 120° C. for 6 hours.

Then, 69.3 wt % of the dried thermoplastic polyurethane, 30 wt % of the dried superfine silk fibroin particles and 0.7 wt % of a phenol type anti-oxidization agent as a thermal stabilizer were mixed, and the mixture was kneaded using a two-axis extruder to produce a master batch.

The master batch was then dried at 135° C. for 6 hours, and then it was mixed with the thermoplastic polyurethane. The superfine silk fibroin particles was incorporated in an amount of 10 wt %. The material was then dried using a drier with a hopper at 135° C. and supplied to an inflation apparatus to produce the thermoplastic polyurethane film (with a thickness of 30 μm) in this Example. In this process of manufacture, the anti-blocking property during the film formation was checked. The result is shown in Table 17.

The anti-blocking property was evaluated in terms of the ease of separating the inflation molded cylindrical film when the film was opened. As the evaluation standards, the circle mark represents "satisfactory anti-blocking property", the triangle mark represents "usual", and the cross mark represents "unsatisfactory anti-blocking property".

With this thermoplastic polyurethane film containing superfine silk fibroin particles, the overall character was evaluated. Also, the moisture permeability, condensation amount and moisture absorption and releasing amounts were measured. The results are shown in Table 18.

The overall character was evaluated from the touch, such as sense of touch and softness, by randomly selected ten persons. As the evaluation standards, the double circle mark represents "very good", the circle mark represents "good", the triangle mark represents "usual", and the cross mark represents "bad".

The condensation amount was measured in the following way.

First, the test room atmosphere was held under conditions of 23° C. and 50% RH. In this test room, filter paper impregnated with water was held on a hot plate to cause steam generation. Above the hot plate a sample with the dimensions of 10×10 cm was held for condensation. The test was conducted in a sealed system lest steam between the filter paper and the sample escape. After the lapse of 10 minutes, the sample was taken out. Absorption paper was caused to absorb water of condensation, and the condensation amount was measured from the weight change.

The moisture permeability and moisture absorption and release were measured in the same ways as in Example 22.

EXAMPLES 30 AND 31

A thermoplastic polyurethane film containing superfine silk fibroin particles was produced in the same way as in Example 29 except for changing the superfine silk powder content. In Example 30, the content was set to 3 wt %, and in Example 31 it was set to 6 wt %.

As in Example 29, the anti-blocking property during the film formation was examined. The result is shown in Table 17.

COMPARATIVE EXAMPLES 17 AND 18

In Comparative Example 17, a thermoplastic polyurethane film was produced in the same way as in Example 29 except that the thermoplastic polyurethane was dried at 105° C. for 4 hours and that 3 wt % of wax was added as the anti-blocking agent in lieu of the superfine silk fibroin particles.

In Comparative Example 18, a thermoplastic polyurethane film was produced in the same way as in Comparative Example 17 except for that no anti-blocking agent was added.

In Comparative Example 17, as in Example 29, the anti-blocking property and the overall character were evaluated. In Comparative Example 18, the sole anti-blocking property was evaluated. The results are shown in Tables 17 and 18.

EXAMPLE 32

A laminate which has a film containing superfine silk fibroin particles as one layer, was produced by bonding the film obtained in Example 29 to a base material constituted by woven cloth of blended spun fibers of 50% nylon and 50% Teflon by using an urethane type adhesive for dry laminates.

COMPARATIVE EXAMPLE 19

A laminate was produced in the manner as in Example 32 by using the polyurethane film produced in Comparative Example 17.

With the laminates in Example 32 and Comparative Example 19, as in Example 29, the overall character evaluation and measurements of the moisture absorption and releasing were made.

TABLE 17

|  | Example 29 | Example 30 | Example 31 | Com. Ex. 17 | Com. Ex. 18 |
| --- | --- | --- | --- | --- | --- |
| Anti-blocking property | O | Δ | O~Δ | O~Δ | x |

TABLE 18

|  |  | Example 29 | Example 32 | Com. Ex. 17 | Com. Ex. 19 |
| --- | --- | --- | --- | --- | --- |
| Overall character |  | ⊚ | ⊚ | Δ | Δ |
| Moisture permeability (g/m²/24 hrs) |  | 1700 | — | 1200 | — |
| Condensation (g/m²) |  | 6.6 | — | 9.3 | — |
| Condensation (g/m²) | after 20 min. | 1.0 | 13.0 | 0.3 | 8.0 |
|  | after 1 hr. | 1.3 | 15.3 | 0.4 | 10.0 |
|  | after 4 hrs. | 1.5 | 22.0 | 0.7 | 12.0 |
| Releasing (g/m²) | after 20 min. | 0.9 | 12.1 | 0.3 | 9.0 |
|  | after 1 hr. | 1.2 | 15.0 | 0.4 | 9.0 |
|  | after 4 hrs. | 1.4 | 21.9 | 0.6 | 11.5 |

From Tables 17 and 18, it will be seen that the thermoplastic polyurethane film in Example 29 is excellent in the anti-blocking property and also in the overall character, moisture permeability, anti-condensation property and moisture absorbing/releasing property because it contains the superfine silk fibroin particles according to the invention.

As in Examples 30 and 31, however, with less superfine silk fibroin content compared to that in Example 29, the anti-blocking property is correspondingly inferior. The superfine silk fibroin powder thus is to be added in a necessary amount corresponding to the desired characteristics.

Further, the laminate in Example 32, which has the thermoplastic polyurethane film as one of a plurality of layers, is excellent in overall character, moisture absorbing/releasing property, etc. because the thermoplastic polyurethane film contains the superfine silk fibroin film according to the invention.

On the other hand, with the thermoplastic polyurethane film in Comparative Example 17, it will be seen that the overall character, moisture absorbing/releasing property, etc. are not so satisfactory as in the example because the anti-blocking agent is a wax.

Further, it will be seen that the thermoplastic polyurethane film in Comparative Example 18 has problems in the anti-blocking property because no anti-blocking agent is added.

With the laminate in Comparative Example 19, which has the thermoplastic polyurethane film as one of a plurality of layers, the overall character, moisture absorbing/releasing property, etc. are not so satisfactory as in the example because the thermoplastic polyurethane film does not contain the superfine silk fibroin particles according to the invention.

A thermoplastic polyurethane film was produced which contained superfine silk fibroin particles without being subjected to the methanol treatment (i.e., beta-treatment). It was found that the superfine silk fibroin particles was dispersed in the film unsatisfactorily. In addition, the moisture absorbing/releasing property of the film was inferior.

Below are given examples of the molding and composite molding of thermoplastic resin compositions containing superfine silk fibroin particles.

EXAMPLE 33

The superfine silk fibroin particles used in this example was obtained in the same way as in Example 22.

90 wt % of a chain-like low density polyethylene (L-LDPE manufactured by Idemitu Sekiyu Kagaku Co., Ltd.) as a thermoplastic resin and 10 wt % of superfine silk fibroin particles (with an average particle diameter of 5 μm) were mixed, and the mixture was then kneaded using a Bumbury's mixer ("Lavoplast Mill", a trade name, Model B-600, manufactured by Toyo Seiki Seisakusho Co., Ltd.).

Then, gas purging was made repeatedly ten times under a pressure ranging from 0 to 30 kg/cm$^2$ in a press molder (i.e., an oil hydraulic molder for thermal fusion molding Model HT-50-C, manufactured by KitaJuji Co., Ltd.), followed by molding under conditions of 100 kg/cm$^2$, 160° C. and 3 minutes and then cooling under 100 kg/cm$^2$ for 10 minutes using the same press molder (for cooling), thus obtaining a thermoplastic resin composition molding containing superfine silk fibroin particles.

The molding temperature was 160° C. for L-LDPE and TPO and 200° C. for PS and HDPE.

EXAMPLE 34

A thermoplastic resin composition molding containing superfine silk fibroin particles was obtained in the same way as in Example 33 except that the content of L-LDPE was set to 60 wt % and the content of the superfine silk fibroin particles to 40 wt %.

EXAMPLES 35 AND 36

In these examples, molding products were obtained in the same way as in Example 33 except that a thermoplastic polyolefin elastomer (TPO) was used in lieu of L-LDPE. In Example 35, the content of the TPO and superfine silk fibroin particles were set to 90 and 10 wt %, respectively, and in Example 36 the content of TPO and superfine silk fibroin particles were set to 60 and 40 wt %, respectively.

EXAMPLES 37 AND 38

In these examples, molding products were obtained in the same way as in Example 33 except that polystyrene (PS) was used in lieu of L-LDPE.

In Example 37, the contents of the PS and superfine silk fibroin particles were set to 90 and 10 wt %, respectively, and in Example 38 the contents of the PS and superfine silk fibroin particles were set to 60 and 40 wt %, respectively.

EXAMPLES 39 AND 40

In these examples, molding products were obtained in the same way as in Example 33 except that high density polyethylene (HDPE) was used in lieu of L-LDPE.

In Example 39, the content of the HDPE and superfine silk fibroin particles were set to 90 to 10 wt %, respectively, and in Example 40, the content of the HDPE and superfine silk fibroin particles were set to 60 and 40 wt %, respectively.

COMPARATIVE EXAMPLE 20

A thermoplastic resin composition molding was obtained in the same way as in Example 33 except that the content of the L-LDPE was set to 100 wt %, without the incorporation of superfine silk fibroin particles.

COMPARATIVE EXAMPLE 21

A thermoplastic resin composition molding containing superfine silk fibroin particles was obtained in the same way as in Example 33 except that the content of the TPO was set to 100 wt %, without the incorporation of superfine silk fibroin particles.

COMPARATIVE EXAMPLE 22

A thermoplastic resin composition molding containing superfine silk fibroin particles was obtained in the same way as in Example 33 except that the HDPE content was set to 100 wt %, without the incorporation of superfine silk fibroin particles.

With the moldings in Examples 33 to 40 and Comparative Examples 20 to 23, the moisture absorbing/releasing property, static friction coefficient, and condensation amount were measured, and also the sense of touch, moldability and appearance were evaluated. The results are shown in Table 19. In the Table, F in "F content" means superfine silk fibroin particles. The characteristic measurements and the evaluation were made in the following ways.

Moisture absorbing/releasing property

For this property, the moisture absorbing property is determined by holding the molding in an atmosphere at 23° C. and at a relative humidity of 80% for moisture absorption for 24 hours and then measuring the resultant weight change per unit volume. The moisture releasing property was determined by subsequently holding the molding in an atmosphere at 23° C. and at a relative humidity of 30% for moisture releasing for 24 hours and then measuring the resultant weight change per unit volume.

Static friction coefficient

The Idemitsu process was used. Using a compression molded square sheet 2 mm in thickness and 10 cm on one side, the static friction coefficient was measured with a fiction measuring apparatus (Model AN, manufactured by Toyo Seiki Seisakusho Co., Ltd.).

Condensation amount

A compression molded square sheet 2 mm in thickness and 10 cm on one side was used. Filter paper wetted with water was held to be 5 mm below the underside of the sheet noted above, and the filter paper side was sealed to be at 33° C. and a relative humidity of 100%. Then, the upper surface of the sheet was exposed for 10 minutes to a state at 23° C. and at a relative humidity of 50%. Then, the weight of the condensed moisture per unit area was determined by measuring the amount of water resulting from the condensation on the filter paper side.

Sense of touch

Moldings for evaluating the sense of touch were produced by using an injection molder ("Toshiba IS-150E" manufactured by Toshiba Co., Ltd.), at a molding temperature of 160° C. and a die temperature of 30° C. when L-LDPE was used as a resin, at a molding temperature of 180° C. and a die temperature of 30° C. when TPO was used as a resin, and at a molding temperature of 200° C. and a die temperature of 45° C. when PS was used as a resin. When HDPE was used as a resin, the molding was produced using a flow molder (manufactured by Plako Co., Ltd.) at a molding temperature of 190° C. and a die temperature of 30° C.

Where the resin used was L-LDPE, TPO (thermoplastic polyolefin elastomer) and PS (polystyrene), the molding that was produced for the touch sense evaluation, was a glasses case (with a length of 18 cm, a width of 7 cm, a total width of 14.5 cm when the case was open, and a thickness of 2 mm) obtained by injection molding. Where the resin used was HDPE (high density polyethylene), the molding was a bottle (with an outer diameter of 8 cm and a height of 17 cm) obtained by hollow molding.

The touch sense evaluation standards were as follows.

5 points—"Very good sense of touch"

4 points—"good sense of touch"

3 points—"usual"

2 points—"bad sense of touch"

1 point—"very bad sense of touch"

Molding property, Appearance

The appearance was evaluated as a matting effect. As the molding property, the molding property of the base material was compared under the following conditions.

The standards of evaluation of the molding property and appearance were: 3 points—"good", 2 points—"usual", 1 point—"bad".

The composite molding according to the invention was obtained by incorporating cotton cloth as an internal fitting in the glasses case noted above.

Further, it will be seen that the thermoplastic resin composition moldings in Comparative Examples 20 to 23, unlike those in Examples 33 to 40, are unsatisfactory in the moisture absorbing/releasing property, static friction coefficient and condensation amount and also inferior in the sense of touch, molding property and appearance, because they do not contain the superfine silk fibroin powder according to the invention.

Below are given examples of the fiber treating material as well as fibers, fiber material cloth and fiber material surface treated with the same fiber treating material.

EXAMPLE 41

The superfine silk fibroin particles used in this example was obtained in the same way as in Example 22.

3 g of a reactive amino-denatured silicon type resin emulsion ("Quinset PSR-10", a trade name, with solid part of 30%, manufactured by Kotani Kagaku Co., Ltd.), 3 g of the superfine silk fibroin particles and water were mixed such that the total amount was 100 ml, thus preparing the fiber treating solution in this example.

Then, a polyester cloth for blouses was dipped in this solution. Then, excess treatment material was removed from the cloth with a mangle (with an inter-roll pressure of 1 kg/cm$^2$) (pad process). The mangle is a squeezing apparatus comprising a pair of opposed rolls, one being a metal roll and the other being a rubber roll, an wet object being passed through the two rolls to squeeze out water.

The resultant cloth was dried at 80° C. for 5 minutes. Subsequently, the cloth was heat treated at 170° C. for 2 minutes, thus obtaining the fiber material cloth treated with the fiber treating material in this example.

EXAMPLE 42

The same operation was performed as in Example 41 up to the drying step. Then, the cloth was dipped in a bath obtained by adding water to 3 g of "Quinset PSR-10" (a trade name) such that the total amount was 100 ml. Then, as

TABLE 19

| EXAMPLES | Resin (content in wt %) | F content (wt %) | Moisture absorption/releasing (kg/m$^3$) | Static friction | Condensation amount (kg/m$^2$) | Sense of touch | Molding property | Appearance |
|---|---|---|---|---|---|---|---|---|
| 33 | L-LDPE(90) | 10 | 2.7/1.0 | 0.53 | 6.8 | 4 | 3 | 2 |
| 34 | L-LDPE(60) | 40 | 9.5/5.7 | 0.31 | 2.1 | 5 | 3 | 3 |
| 35 | TPO(90) | 10 | 2.5/1.7 | 0.66 | 3.6 | 4 | 3 | 2 |
| 36 | TPO(60) | 40 | 9.4/4.3 | 0.41 | 2.7 | 4 | 3 | 3 |
| 37 | PS(90) | 10 | 3.1/1.3 | 0.31 | 6.2 | 5 | 3 | 2 |
| 38 | PS(60) | 40 | 12.3/7.1 | 0.14 | 5.3 | 5 | 2 | 3 |
| 39 | HDPE(90) | 10 | 2.7/1.1 | 0.24 | 6.3 | 4 | 2 | 3 |
| 40 | HDPE(60) | 40 | 10.7/4.1 | 0.23 | 5.4 | 5 | 2 | 3 |

From Table 19, it will be seen that the thermoplastic resin composition moldings in Examples 33 to 40 are satisfactory in their moisture absorbing/releasing property, static friction coefficient and condensation amount and, in addition, excellent in the sense of touch, molding property and appearance, because they contain the superfine silk fibroin particles according to the invention.

Further, by comparing the superfine silk fibroin particles contents of 10 and 40 wt %, at the content of 40 wt %, the characteristics are generally better.

in Example 41, the work was passed through the mangle, followed by drying and subsequent heat treatment.

EXAMPLES 43 AND 44

In these examples, fiber material cloth samples treated with fiber treating material were obtained in the same way as in Example 41 except that stocking material cloth was used which was a braiding of composite fibers comprising nylon fibers covering polyurethane core fibers.

In Example 44, the same treatment as in Example 42 was carried out twice.

EXAMPLES 45 AND 46

In these examples, fiber material cloth samples were obtained in the same way as in Example 41 except for using cotton fabric (broad cloth) for shirts. In Example 46, the same treatment as in Example 42 was carried out twice.

EXAMPLES 47 AND 48

In these examples, fiber material cloth samples treated with fiber treating material were obtained in the same way as in Example 41 except for using an urethane type resin emulsion ("Eslatron S-24", a trade name, with solid part of 45%, manufactured by Daiichi Kogyo Seiyaku Co., Ltd.) in lieu of a silicon type resin emulsion and using the same stocking material cloth as in Example 43 in lieu of the polyester material cloth for blouses.

In Example 48, the treatment as in Example 42 was carried out twice.

COMPARATIVE EXAMPLE 24

In this comparative example, a fiber material cloth sample was obtained in the same way as in Example 41 except that the superfine silk fibroin particles was not incorporated.

COMPARATIVE EXAMPLE 25

In this comparative example, a fiber material cloth sample was obtained in the same way as in Example 43 except that the superfine silk fibroin particles was not incorporated.

COMPARATIVE EXAMPLE 26

In this comparative example, a fiber material cloth sample was obtained in the same way as in Example 45 except that the superfine silk fibroin particles was not incorporated.

COMPARATIVE EXAMPLE 27

In this comparative example, a fiber material cloth sample was obtained in the same way as in Example 47 except that the superfine silk fibroin particles was not incorporated.
Evaluation of moisture permeability, surface touch sense and washing resistance With the fiber cloth samples obtained in Examples 41 to 48 and Comparative Examples 24 to 27, the moisture absorption property, surface touch sense and washing resistance were evaluated. The results are shown in Table 20. The tests were done in the following ways.
(Moisture absorption property)

A sample which had reached equilibrium at 23° C. and 30% RH, was held in an atmosphere at 23° C. and 80% RH for 4 hours, and the resultant weight increase was measured.
(Surface touch sense)

The sense of touch on the sample surface by hand was compared. The evaluation was done by 20 randomly selected persons with the following standards (given as average points).
5 points—"very good sense of touch", 4 points—"good sense of touch", 3 points—"usual", 2 points—"bad sense of touch", 1 point—"very bad sense of touch".
(Washing resistance)

The samples were washed ten times repeatedly using a totally automatic home washer, and the extent of attachment of superfine silk fibroin particles was determined by measuring weights before and after the washing.

TABLE 20

|  | Moisture absorption (mg/g) | Surface touch | Weight of cloth (g) | Amount of attachment after treatment (g) | Percentage of attachment after washing (%) |
|---|---|---|---|---|---|
| | | | | Washing resistance | |
| Example 41 | — | 4.3 | 6.272 | 0.195 | 75.8 |
| Example 42 | — | 4.2 | 5.805 | 0.230 | 96.2 |
| Example 43 | 41 | 4.8 | 2.246 | 0.068 | 80.3 |
| Example 44 | 38 | 4.8 | 2.534 | 0.072 | 97.4 |
| Example 45 | — | 4.2 | 4.775 | 0.074 | 76.2 |
| Example 46 | — | 4.0 | 4.767 | 0.098 | 91.3 |
| Example 47 | 42 | 4.8 | 2.356 | 0.064 | 81.3 |
| Example 48 | 40 | 4.8 | 2.104 | 0.071 | 92.5 |
| Com. Ex. 24 | — | 3.8 | 6.370 | 0.093 | 96.8 |
| Com. Ex. 25 | 23 | 4.0 | 2.301 | 0.055 | 98.6 |
| Com. Ex. 26 | — | 3.2 | 5.189 | 0.049 | 95.7 |
| Com. Ex. 27 | 28 | 3.9 | 2.219 | 0.044 | 95.3 |

From Table 20, it will be seen that the fiber material cloth samples obtained in Examples 41 to 48 were excellent in the moisture absorption property and surface touch sense, because they have been treated with fiber treating material containing the superfine silk fibroin particles according to the invention.

Further, the fiber material cloth samples having been treated twice as in Examples 42, 44, 46 and 48, are substantially the same in the percent attachment after washing as those having been treated with treating material free from superfine silk fibroin particles (Comparative Examples 24 to 27). Thus, it will be seen that with a twofold treatment, it is possible to improve the release of superfine silk fibroin particles.

On the other hand, it will be seen that the fiber material cloth samples in Comparative Examples 24 to 27 are inferior in the moisture absorbing/releasing property and surface touch sense to the examples, because they have been treated with fiber treating material free from the superfine silk fibroin particles according to the invention.

EXAMPLE 49

This example concerns a fiber treading material solution, which was prepared by mixing 45 and 15 wt. parts, respectively, of "Boncoat AN198" and "Boncoat AN865" (trade names, manufactured by Dainihon Inki Kagaku Co., Ltd.), 1.2 wt. parts of a cross-linking material "CR52" (a trade name, manufactured by Dainihon Inki Kagaku Co., Ltd.), 20 wt. parts of superfine silk fibroin particles and 40 wt. parts of water. The solution was coated by spray coating on polyester inner cotton for ski wear weighing 69 g/m², followed by drying at 140° C. for 5 minutes, thus obtaining a fiber material cotton treated with the fiber treating material in this embodiment. This fiber material cotton weighed 80 g/m².

COMPARATIVE EXAMPLE 28

In this comparative example, fiber material cotton was obtained in the same way as in Example 49 except that no superfine silk fibroin particles was added.
Evaluation of moisture absorption and anti-charging effect With the fiber material cotton samples obtained in Example 49 and Comparative Example 28, the moisture absorption and anti-charging effect were evaluated. The results are shown in Table 21.
(Anti-charging effect)

Frictional breakdown voltage was measured in conformity to the JIS L 1094 B process.

TABLE 21

|  | Absorption (mg/g) | Friction breakdown voltage (V) |
|---|---|---|
| Example 49 | 20.8 | 820 |
| Com. Ex. 28 | 10.2 | 8300 |

From Table 21, it will be seen that the fiber material cotton in Example is excellent in the moisture absorbing property and also in the anti-charging effect, because it has been treated with a fiber treating material containing the superfine silk fibroin particles according to the invention.

On the other hand, it will be seen that the fiber material cotton in Comparative Example 28 is inferior in the moisture absorbing property and anti-charging effect to the above example, because it has been treated with a fiber treating material free from the superfine silk fibroin particles according to the invention.

Below are given examples concerning paint containing superfine silk fibroin particles.

EXAMPLE 50

The superfine silk fibroin particles used in this example was obtained in the same way as in Example 22.

The paint in this example was prepared by incorporating 10% of the superfine silk fibroin particles in a solvent type urethane resin solution. This paint was then coated by blowing on an ABS sheet (2 mm thickness) using a spray gun (manufactured by Iwata Tsoki Kogyo Co., Ltd.).

EXAMPLE 51

A coating was made in the same way as in Example 50 except that an aqueous urethane resin emulsion ("Superflex 410", a trade name, manufactured by Daiichi Kogyo Seiyaku Co., Ltd.) was used in lieu of the solvent type urethane resin solution.

EXAMPLE 52

This example was the same as Example 50 except that an iron sheet (2 mm thickness) was used as the workpiece to be coated.

COMPARATIVE EXAMPLE 29

This comparative example was the same as Example 50 except that no silk fibroin particles was incorporated in the resin.

COMPARATIVE EXAMPLE 30

A paint was prepared in the same way as in Example 50 except that 10% of fine silica powder was incorporated in lieu of superfine silk fibroin particles. The paint was then coated in the same way as in Example 50.

COMPARATIVE EXAMPLE 31

This comparative example was the same as Example 51 except for no superfine silk fibroin particles was incorporated in the resin.

COMPARATIVE EXAMPLE 32

A paint was prepared in the same way as in Example 51 except that 10% of fine silica powder was incorporated in lieu of superfine silk fibroin particles. The paint was coated in the same way as in Example 50.

COMPARATIVE EXAMPLE 33

This Comparative Example was the same as Example 52 except that an iron sheet (2 mm thickness) was used as the workpiece to be coated.

Evaluation of the moisture absorption property, touch sense, anti-dazzling property and anti-charging property of paint With the paints in Examples 50 to 52 and Comparative Examples 29 to 33, the moisture absorbing property, touch sense, anti-dazzling property and anti-charging property were evaluated as follows. The results are shown in Table 22.

(1) Method of moisture absorption property evaluation

Water was coated on the coating film for an area with a width of 2 cm and a length of 3 cm using a brush, and the time of drying was measured visually.

(2) Method of touch sense evaluation 20 randomly selected persons touched the coating film and evaluated the sense of touch to be "excellent", "good" or "bad".

(3) Method of anti-dazzling property evaluation

A sample was placed on a desk, and it was illuminated with intense light from one side of the desk to the other side. A person who was seated on the other side of the desk checked whether light reflected from the sample was dazzling. 20 persons participated in the evaluation. As the light source was used a reflection lamp for delight color (500 W, manufactured by Matsushita Denki Sangyo Co., Ltd.). In Table 22, the circle mark represents "not dazzling", and the cross mark represents "dazzling".

(4) Method of anti-charging property evaluation

The sample was rubbed with cotton cloth in conformity to JIS-L1094B, and the voltage of charging was measured after one minute. The voltage of charging was measured by using a rotary static tester ("Model RST-201", manufactured by Kowa Shokai Co., Ltd.).

TABLE 22

|  | Moisture absorption (sec.) | Touch sense | Anti-dazzling property (V) | Charging voltage (V) |
|---|---|---|---|---|
| Example 50 | 13 | Excellent | ○ | 1200 |
| Example 51 | 10 | Excellent | ○ | 1400 |
| Example 52 | 14 | Excellent | ○ | 1000 |
| Com. Ex. 29 | 60 or more | Bad | x | 6000 |
| Com. Ex. 30 | 42 | Bad | ○ | 5200 |
| Com. Ex. 31 | 60 or more | Bad | x | 6500 |
| Com. Ex. 32 | 37 | Bad | ○ | 4800 |
| Com. Ex. 33 | 40 | Bad | x | 3000 |

From Table 22, it will be seen that the paints in Examples 50 to 52 are excellent in moisture absorption property and touch sense, because they contain the superfine silk fibroin particles according to the invention.

They are also excellent in anti-dazzling property and anti-charging property. Particularly, the anti-charging capability is one-third or below of the Comparative Example.

On the other hand, it will be seen that the paints in Comparative Examples 29, 31 and 33 are inferior in the moisture absorbing property and touch sense, because they do not contain the superfine silk fibroin particles according to the invention. Further, they are inferior in the anti-dazzling property and anti-charging property.

Further, it will be seen that the paints in Comparative Examples 30 and 32 were inferior in the moisture absorption property and touch sense to the paints in the examples, because they contained fine silica powder in lieu of the superfine silk fibroin particles according to the invention.

Further, their anti-charging property was unsatisfactory although they posed no problem insofar as the anti-dazzling property was concerned.

Below are given examples of data display surface formation paint containing superfine silk fibroin particles.

EXAMPLE 53

The superfine silk fibroin particles that were used in this example, was obtained in the same way as in Example 22.

In this example, a data display surface formation paint was prepared by adding 15% of the superfine silk fibroin particles obtained in the above way to commercially available solvent type paint "Sericall Ink" (a trade name, manufactured by Teikoku Ink Seizo Co., Ltd.).

EXAMPLE 54

In this example, a data display surface formation paint was prepared by adding 30% of the superfine silk fibroin particles obtained in the above way to an aqueous acrylic emulsion.

COMPARATIVE EXAMPLE 34

This comparative example concerns "Sericall Ink" (a trade name) itself.

COMPARATIVE EXAMPLE 35

In this comparative example, a data display surface formation paint was prepared by adding 15% of fine silica powder as a comparative powder to "Sericall Ink" (a trade name).

COMPARATIVE EXAMPLE 36

This comparative example concerns the aqueous acrylic emulsion itself.

COMPARATIVE EXAMPLE 37

In this comparative example, a data display surface formation paint was prepared by adding 30% of fine hydrophilic silica powder to an aqueous acrylic emulsion.
Evaluation of characteristics The data display surface formation paints in the above examples and comparative examples were each printed on a polycarbonate sheet (with a thickness of 0.5 mm) and also on paper for dry PPC "My Paper" (a trade name, manufactured by Nihon Business Supply Co., Ltd.) to obtain samples, and the close contactness, printing property and touch sense of these samples were evaluation.

(1) Close contactness

The close contactness evaluation test was conducted by applying a wear resistance test. Specifically, 100 g of a load was applied to a friction element (i.e., a sheet-like member) provided with "Kanakin No. 3" (a trade name of cotton cloth) and rubbing the sample surface 50 times with this friction element.

It was found that the samples in Examples 53 and 54 and Comparative Examples 34 to 37 were all satisfactory in the close contactness of the data display surface formation paint.

(2) Printing property

The printing property evaluation test was conducted by making screen printing on each sample, and observing the printing property.

It was found that the samples in Examples 53 and 54 and Comparative Examples 34 to 37 were all satisfactory in the printing property.

(3) Writing accessibility

Superimposition writing is made on each sample by using the following writing tools. The evaluation was made by measuring the time until the superimposition written letters were dried. The measurement was made four or more times. The results are shown in Table 23.

TABLE 23

|  | Time until drying of paint (sec.) | | | |
| --- | --- | --- | --- | --- |
|  | Writing tool (1) | Writing tool (2) | Writing tool (3) | Writing tool (3) |
| Example 53 | 5.6 | 7.4 | 3 or less | 4.7 |
| Example 54 | 4.2 | 7.0 | 3 or less | 3.6 |
| Com. Ex. 34 | 60 OR MORE | 60 or more | 8 | 60 or more |
| Com. Ex. 35 | 7.8 | 9.1 | 3 or less | 6.5 |
| Com. Ex. 36 | 60 or more | 60 or more | 8 | 60 or more |
| Com. Ex. 37 | 7.2 | 8.6 | 3 or less | 5.9 |

The writing tool used was (1) an X-Y plotter (an aqueous ink) or (2) a brush pen (manufactured by Gochiku Seishydo Co., Ltd.) in case of "My Paper" (a trade name) and (3) an oily felt pen (manufactured by Mitsubishi Enpitsu Co., Ltd.) or (4) an aqueous felt pen (Mitsubishi Enpitsu Co., Ltd.). The X-Y plotter was "WX2400" (manufactured by Graphic Co., Ltd.) with a recording sheet speed of 1 cm/sec. and an input range of 0.5 V.

From Table 23 it will be seen that the samples in Examples 53 and 54 have a greatly improved drying property when superimposition writing was made with a writing tool compared to the comparative examples, because the superfine silk fibroin particles was contained in the data display surface formation paint.

On the other hand, it will be seen that the samples in Comparative Examples 34 to 37 do not have such a satisfactory drying property when superimposition writing was made with a writing tool compared to Examples 53 and 54, because the superfine silk fibroin particles according to the invention was not contained or fine hydrophilic powder was used in lieu of the superfine silk fibroin particles.

(4) Touch sense

The touch sense was evaluated through evaluation of the overall character, test of writing and clarity of written letter by 20 randomly selected company monitors. The overall evaluation is the evaluation of the sense of touch to the coating film. The test of writing and clarity of written letter are evaluations concerning the writing accessibility. The evaluation standards were in five states from "5" (good) to "1" (bad). The results are shown in Table 24.

TABLE 24

|  | Overall character | Writing taste | Clarity of written letter |
| --- | --- | --- | --- |
| Example 53 | 5 | 5 | 4 |
| Example 54 | 5 | 5 | 4 |
| Com. Ex. 34 | 1 | 1 | 3 |
| Com. Ex. 35 | 3 | 3 | 3 |
| Com. Ex. 36 | 3 | 2 | 2 |
| Com. Ex. 37 | 4 | 4 | 3 |

From Table 24, it will be seen that the samples in Examples 53 and 54 are satisfactory in all the characteristics of the overall character, writing taste and clarity of written letter, because the superfine silk fibroin particles according to the invention was contained in the data display surface formation paint.

On the other hand, it will be seen that the samples in Comparative Examples 34 to 37 are unsatisfactory in at least one of the characters of the overall character, writing taste and clarity of written letter, because the superfine silk fibroin particles according to the invention was not contained or fine hydrophilic silica powder was contained in lieu of superfine silk fibroin particles.

Industrial Utility

The invention, owing to the incorporation of fine silk powder or like fine natural organic material powder, is excellent in the moisture absorbing/releasing property, moisture permeability and touch sense, and is particularly suitable for application to plastic films and sheets, various moldings, paints, fiber treating materials, etc. which are frequently touched by the hand.

What is claimed is:

1. A thermoplastic film comprising from 1 to 40 wt. % of a natural organic substance fine powder selected from the group consisting of silk powder, wool powder, cellulose powder and chitin powder and having a water content of less than 10 wt. % and an average particle size of less than 10µ, and a thermoplastic resin selected from the group consisting of an elastomer and a polyolefin, and being formed by inflation molding, T-die molding or calender molding.

2. A laminate having the film according to claim 1 as one of a plurality of layers.

3. A coating material which forms an information display surface, said coating material comprising 5–80 wt. % of a natural organic substance fine powder selected from the group consisting of silk powder, wool powder, cellulose powder, chitin powder and collagen powder, and having an average particle size of less than 15µ and a water content less than 10 wt. %.

4. A product having a surface to be written on, which is formed by the coating material of claim 3.

5. Superfine silk fibroin particles manufactured by a process comprising a first comminuting step of comminuting silk fibroin into coarse particles with dry mechanical comminuting means, a second comminuting step of comminuting said coarse silk fibroin particles into fine particles with dry mechanical comminuting means, and a third comminuting step of comminuting said fine silk fibroin particles into superfine particles with an average particle diameter no greater than 10 µm with dry mechanical comminuting means, said silk fibroin particles being treated during or after at least one of said comminuting steps.

6. In a method of manufacturing a thermoplastic film comprising a step of forming a thermoplastic material into a film by inflation molding, T-die molding or calender molding, the improvement comprising said thermoplastic material containing from 1 to 40 wt. % of a natural organic substance fine powder selected from the group consisting of silk powder, wool powder, cellulose powder and chitin powder and having a water content of less than 10 wt. % and an average particle size of less than 10µ, and a thermoplastic resin selected from the group consisting of an elastomer and a polyolefin.

7. The method of manufacturing a thermoplastic film according to claim 6, wherein the film is formed by setting the water content of said thermoplastic material containing said fine natural organic material powder to 5 wt %.

8. A method for producing silk fibroin ultrafine powder comprising:

a first step of pulverizing silk fibroin into a crushed powder state by a dry mechanical pulverization means;

a second step of pulverizing the silk fibroin crushed powder into a fine powder state by a dry mechanical pulverization means;

a third step of pulverizing the silk fibroin fine powder into a ultrafine powder having an average particle diameter no greater than 10 µm by a dry mechanical pulverization means; and a step of beta-treating the silk fibroin powder in at least one of said previous steps or after said third step.

9. A method for producing silk fibroin ultrafine powder in accordance with claim 8, wherein the dry mechanical pulverization means used in said second pulverizing step is a ball mill and the dry mechanical pulverization means used in said third pulverizing step is a jet mill.

10. A method for producing silk fibroin ultrafine powder in accordance with claim 8, wherein a liquid used in the beta treatment is a solvent or a neutral saline solution.

11. A solvent and resin composition obtained by incorporating the superfine silk fibroin particles according to claim 10 in a solvent and resin solution.

12. A film or a sheet containing superfine silk fibroin particles obtained by adding 1–60 wt. % of the superfine silk fibroin particles according to claim 10 to a solvent and resin solution.

13. A laminate having a film or a sheet containing superfine silk fibroin particles according to claim 12 as one of a plurality of layers laminated on a substrate.

14. A thermoplastic resin composition containing 1–60 wt. % of superfine silk fibroin particles obtained by incorporating the superfine silk fibroin particles according to claim 10 in a thermoplastic resin.

15. A film or a sheet containing superfine silk fibroin particles obtained by incorporating 1–60 wt. % of the fine silk fibroin particles according to claim 10 in a thermoplastic resin.

16. A laminate having a film or a sheet containing superfine silk fibroin particles according to claim 15 as one of a plurality of layers laminated on a substrate.

17. A molding obtained by blow molding, hollow molding or press molding a thermoplastic resin composition containing superfine silk fibroin particles obtained by incorporating 1–60 wt. % of the superfine silk fibroin particles according to claim 10 in a thermoplastic resin.

18. A composite molding comprising the molding according to claim 17 integrated with a different article.

19. A fiber treating material comprising a resin emulsion containing the superfine silk fibroin particles according to claim 10.

20. The fiber treating material according to claim 19, wherein said resin emulsion comprises one or more members selected the group consisting of polyurethane resins, polyester resins, silicon resins, fluorine resins and acrylic resins.

21. Fibers, fiber material cloth or fiber material cotton treated with the fiber treating material according to claim 19.

22. A paint containing superfine silk fibroin particles obtained by incorporating the superfine silk fibroin particles according to claim 10 in a resin.

23. The paint containing superfine silk fibroin particles according to claim 22, wherein said resin is a solvent soluble resin.

24. The paint containing superfine silk fibroin particles according to claim 22, wherein said resin is an aqueous resin.

25. A data display surface formation paint obtained by incorporating 1–90 wt. % of the superfine silk fibroin particles according to claim 10 in a paint composition.

* * * * *